(12) United States Patent
Li et al.

(10) Patent No.: US 8,169,718 B2
(45) Date of Patent: May 1, 2012

(54) WIDE-ANGLE ZOOM LENS

(75) Inventors: Dayong Li, Saitama (JP); Hiroshi Yamamoto, Kawasaki (JP); Hiroki Harada, Zushi (JP)

(73) Assignees: Tamron Co., Ltd., Saitama (JP); Nikon Corporation, Tokyo (JP)

( * ) Notice: Subject to any disclaimer, the term of this patent is extended or adjusted under 35 U.S.C. 154(b) by 197 days.

(21) Appl. No.: 12/662,355

(22) Filed: Apr. 13, 2010

(65) Prior Publication Data

US 2010/0259834 A1 Oct. 14, 2010

(30) Foreign Application Priority Data

| Apr. 13, 2009 | (JP) | 2009-097397 |
| Apr. 13, 2009 | (JP) | 2009-097398 |
| Apr. 13, 2009 | (JP) | 2009-097399 |
| Apr. 13, 2009 | (JP) | 2009-097400 |

(51) Int. Cl.
G02B 9/34 (2006.01)

(52) U.S. Cl. ......................................... 359/781

(58) Field of Classification Search .................. 359/771, 359/781
See application file for complete search history.

(56) References Cited

U.S. PATENT DOCUMENTS
7,075,730 B2 * 7/2006 Nishimura .................... 359/686

FOREIGN PATENT DOCUMENTS
JP 2006039531 A 2/2006
* cited by examiner

Primary Examiner — Joseph P Martinez
(74) Attorney, Agent, or Firm — Jacobson Holman PLLC

(57) ABSTRACT

The present invention is directed to wide-angle zoom lenses dedicated to single-lens reflex digital cameras, which attains zoom ratio greater than 2. Such a wide-angle zoom lens has four groups of lens pieces, namely comprising the leading or foremost 1st lens group of negative refractivity closest to an objective field, the succeeding 2nd lens group of positive refractivity, the third lens group of negative refractivity, and the trailing 4th lens group of positive refractivity arranged in this order to move each lens group to vary optical power; and the 1st lens group includes a front subset of the lens pieces of negative refractive power and a rear subset of negative refractive power. The front-end lens piece in the 1st lens group is shaped in negative meniscus lens that has its concave surface faced toward an imaging plane and has the opposite surfaces shaped aspherical. The front and rear subsets of the 1st lens group meet requirements of a focal length as expressed in the following formula:

$$3.5 \leq |f1b/f1a| \leq 6.0$$

where $f1a$ is a focal length of the front subset of the lens pieces in the 1st lens group and $f1b$ is the focal length of the rear subset in the 1st lens group.

21 Claims, 9 Drawing Sheets

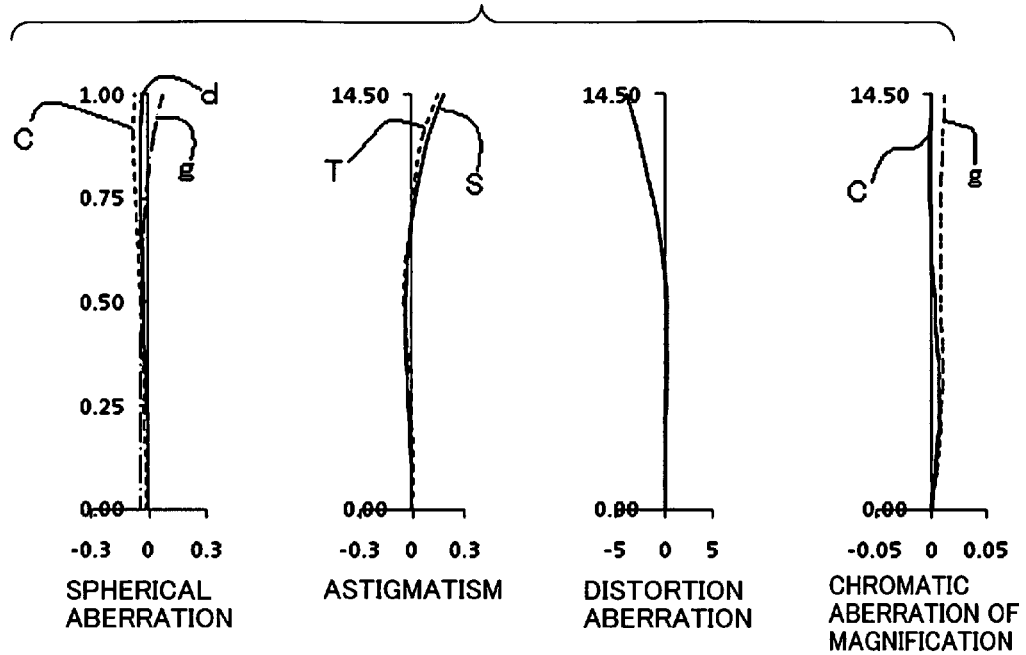
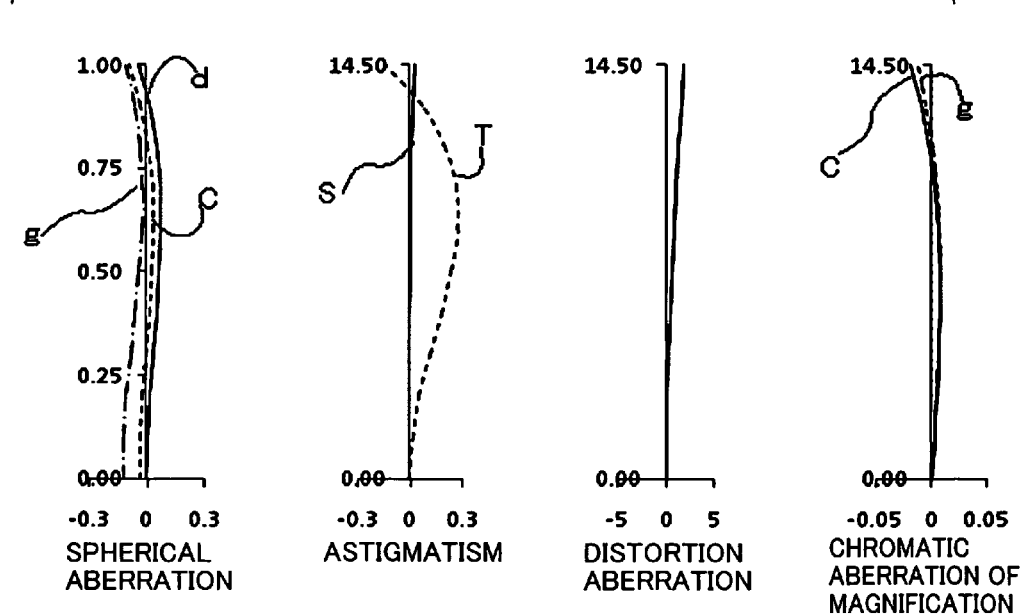

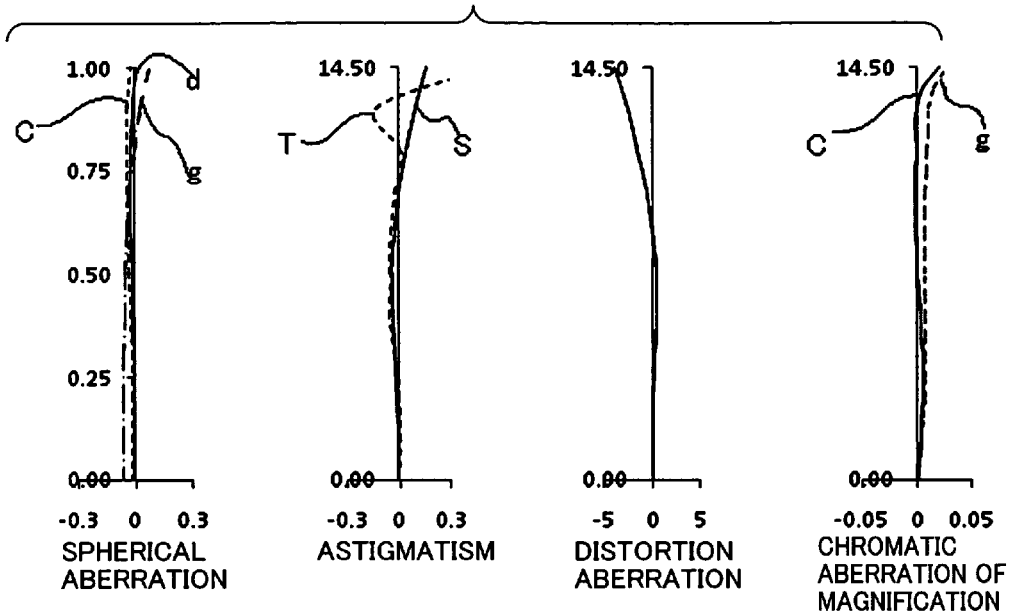
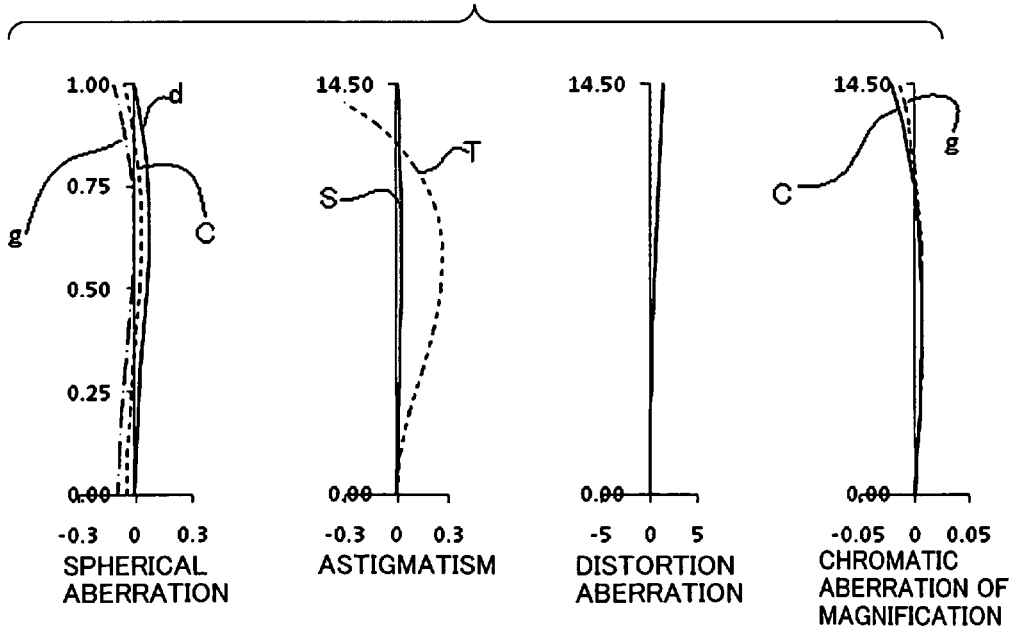

WIDE-ANGLE ZOOM LENS

This application has a priority of Japanese no. 2009-97397 filed Apr. 13, 2009, Japanese no. 2009-97398 filed Apr. 13, 2009, Japanese no. 2009-97399 filed Apr. 13, 2009, and Japanese no. 2009-97400 filed Apr. 13, 2009, hereby incorporated by reference.

TECHNICAL FIELD

The present invention relates to a wide-angle zoom lens of high zoom ratio more than 2, and more particularly, it relates to a wide-angle zoom lens dedicated to single-lens reflex digital cameras that attains hyper wide-angle more than 100 degrees in angle of field and more than 2 in zoom ratio.

BACKGROUND ART

There have been proposed a hyper wide-angle zoom lens suitable for single-lens reflex cameras, such as JP-A (Japanese Preliminary Publication of Unexamined Patent Application) No. 2006-039531. This hyper wide-angle zoom lens has four groups of lens pieces, namely, the leading or foremost 1st lens group of negative refractive power, the succeeding 2nd lens group of positive refractive power, the 3rd lens group of negative refractive power, and the trailing or rearmost 4th lens group of positive refractive power arranged in this order from the closest to an objective field toward an imaging plane; and such zoom lenses have their respective 1st and 2nd lens groups come closer to each other, their respective 2nd and 3rd lens groups come farther apart from each other, and their respective 3rd and 4th lens groups also come closer during zooming from the wide-angle end to the telephoto end, meeting requirements expressed in the following formula:

$$2.9 < bfw/fw < 5.0$$

$$3.1 < f4/fw < 4.5$$

$$0.1 < fw/f2 < 0.42$$

where bfw denotes a back focus at the wide-angle end, fw is a focal length of the entire optics at the wide-angle end, and f2 and f4 are respectively the focal length of the 2nd and 4th lens groups.

The above-mentioned prior art wide-angle zoom lens is all fourfold optics zoom lenses, including the lens groups of negative-positive-negative-positive refractive power combined in this order. They are intended to implement more than 100 degrees of angle of filed at the wide-angle end and to attain high zoom ratio more than 2 as well.

Specifically, the zoom lens disclosed in JP-A-2006-039531 is directed to the angle of filed as wide as 105.8 degrees at the wide-angle end and the zoom ratio as high as 1.05 to 2.36.

This prior art wide-angle zoom lenses typically have their respective 1st lens groups shaped aspherical on more than one major surfaces of the lens pieces. Especially, the zoom lens as set forth in Patent Document 1 comprises the front-end lens piece shaped in concave surface, facing toward the imaging plane, so as to be a meniscus lens of very strong negative refractivity. Such lens optics has a front surface of the front-end lens piece shaped aspherical, thereby downsizing the 1st lens group, as a whole, and compensating for various types of aberration caused therein.

The zoom lens disclosed in Patent Document 1 has its front-end lens piece closest to the objective field deliberately imparted enhanced negative power and has its machinable glass surface shaped aspherical so as to provide the angle of field as wide as 105 degrees at the wide-angle end, thereby advantageously retaining an effective aperture of a forward lens frame as small as possible. However, it is hard to provide the further wider angle of field at the wide-angle end.

DISCLOSURE OF THE INVENTION

In order to solve the above-mentioned problems, according to a first aspect of the present invention, there is provided a wide-angle zoom lens having four groups of lens pieces which are the leading or foremost 1st lens group of negative refractivity closest to an objective field, the succeeding 2nd lens group of positive refractivity, the third lens group of negative refractivity, and the trailing 4th lens group of positive refractivity arranged in this order to move each lens group to vary optical power; and the 1st lens group includes a front subset of the lens pieces of negative refractive power and a rear subset of negative refractive power the latter one of which is displaced toward the objective field for focusing from an infinitely far point to a near view. The front end lens piece closest to the objective field in the 1st lens group is shaped in negative meniscus lens that has its concave surface faced toward an imaging plane and has the opposite surfaces shaped aspherical, and the front and rear subsets of the 1st lens group meet requirements of a focal length as expressed in the following formula:

$$3.5 \leq |f1b/f1a| \leq 6.0 \tag{11}$$

where f1a is a focal length of the front subset of the lens pieces in the 1st lens group and f1b is the focal length of the rear subset in the 1st lens group.

In a second aspect of the present invention, a wide-angle zoom lens has four groups of lens pieces which are the leading or foremost 1st lens group of negative refractivity closest to an objective field, the succeeding 2nd lens group of positive refractivity, the third lens group of negative refractivity, and the trailing 4th lens group of positive refractivity arranged in this order to move each lens group to vary magnification power; and the 1st lens group includes a front subset of the lens pieces of negative refractive power and a rear subset of negative refractive power the latter one of which is displaced toward the objective field for focusing from an infinitely far object to a near view. The front end lens piece closest to the objective field in the 1st lens group is shaped in negative meniscus lens that has its concave surface faced toward an imaging plane and has the opposite surfaces shaped aspherical, and the aspherical surfaces meet requirements as expressed in the following formulae:

$$3.5 \leq \theta 25 \leq 6.5 \tag{12}$$

$$4.5 \leq \theta 100/\theta 25 \leq 7.0 \tag{13}$$

where $\theta 25$ is an angle of a line normal to the front-end aspherical surface of the front-end lens piece along a perimeter radially 25% down from the optical axis or the mid point of the effective diameter, and $\theta 100$ is the angle of the line normal to the front-end aspherical surface along the outermost peripheral edge of the front-end lens piece.

In the first and second aspects, it is preferred that the wide-angle zoom lenses meet a requirement as expressed in the following formula:

$$Y_{max}/F_W \geq 1.3 \tag{14}$$

where Ymax is the maximum real image height, and Fw is a focal length of the whole optics at the wide-angle end.

In the first aspects it is preferred that the wide-angle zoom lens meets the requirements as expressed in the following formulae:

$$3.5 \leq \theta 25 \leq 6.5 \quad (12)$$

$$4.5 \leq \theta 100/\theta 25 \leq 7.0 \quad (13)$$

where θ25 is an angle of a line normal to the front-end aspherical surface of the front-end lens piece along a perimeter radially 25% down from the optical axis or the mid point of the effective diameter, and θ100 is the angle of the line normal to the front-end aspherical surface along the outermost peripheral edge.

In the first and second aspects, it is preferred that the wide-angle zoom lenses meet additional requirements as expressed in the following formulae:

$$0.7 \leq G1R2/F1 \leq 0.9 \quad (15)$$

where G1R2 is radius of curvature of the rear major surface of the front-end lens piece, facing to the imaging plane, and F1 is a focal length of the 1st lens group.

According to a third aspect of the present invention, there is provided a wide-angle zoom lens having four groups of lens pieces which are the leading or foremost 1st lens group of negative refractivity closest to an objective field, the succeeding 2nd lens group of positive refractivity, the third lens group of negative refractivity, and the trailing 4th lens group of positive refractivity arranged in this order to move each lens group to vary optical power; and the 1st lens group includes a front subset of the lens pieces of negative refractive power and a rear subset of negative refractive power the latter one of which is displaced toward the objective field for focusing from an infinitely far point to a near view. The 1st, 2nd and 3rd lens groups serving as a composite lens unit meet requirements of their composite focal length and clearance to an adjacent lens group as follows:

$$1.95 \leq (E4w - F123w)/F4 \leq 3.7 \quad (21)$$

where f123w is a focal length of the composite lens unit of the 1st, 2nd and 3rd lens groups when set to infinity focus at the wide-angle end, F4 is the focal length of the 4th lens group, and E4w is a distance from the principal point closer to an imaging plane in the composite lens unit of the 1st, 2nd and 3rd lens groups to the principal point closer to objects in the 4th lens group.

According to a fourth aspect of the present invention, there is provided a wide-angle zoom has four groups of lens pieces which are the leading or foremost 1st lens group of negative refractivity closest to objects, the succeeding 2nd lens group of positive refractivity, the third lens group of negative refractivity, and the trailing 4th lens group of positive refractivity arranged in this order to move each lens group to vary optical power; and the 1st lens group includes a front subset of the lens pieces of negative refractive power and a rear subset of negative refractive power the latter one of which is displaced toward the objects for focusing from an infinitely far point to a near view. The 1st, 2nd and 3rd lens groups serving as a composite lens unit meet requirements of focal length and clearance to an adjacent lens group as follows:

$$0.5 \leq (-F123w)/F4 \leq 0.85 \quad (22)$$

In the third aspect, it is preferred that the composite lens unit of the 1st, 2nd and 3rd lens groups further satisfies requirements defined as follows:

$$0.5 \leq (-F123w)/F4 \leq 0.85 \quad (22)$$

In the third and fourth aspects, it is preferred that the wide-angle zoom lens has the lens groups satisfying requirements defined as follows:

$$20 \leq Fw*(E4w-F123w)/F4 \leq 38 \quad (23)$$

where Fw is the focal length of the entire optics at the wide-angle end.

In the third and fourth aspects, it is preferred that the wide-angle zoom lens has the lens groups satisfying requirements defined as follows:

$$F23w/(-F1) \geq 6.5 \quad (24)$$

where F23w is a focal length of a composite lens unit of the 2nd and 3rd lens groups at the wide-angle end while F1 is the focal length of the 1st lens group to infinity focus.

In the third and fourth aspects, it is preferred that the 1st lens group of negative refractivity includes a front subset of the lens pieces of negative refractive power and a rear subset of negative refractive power, and the rear subset of the 1st lens group are displaced for focusing from infinitely far point to near view.

In the third and fourth aspects, it is preferred that the front end lens piece closest to the objects in the 1st lens group is a negative meniscus lens having its concave surface faced toward the imaging plane.

According to a fifth aspect of the present invention, there is provided a wide-angle zoom lens having four groups of lens pieces which are the leading or foremost 1st lens group of negative refractivity closest to an objective field, the succeeding 2nd lens group of positive refractivity, the 3rd lens group of negative refractivity, and the trailing 4th lens group of positive refractivity arranged in this order to move each lens group to vary optical power; and intervals between the lens groups adjacent to each other, a focal length of each lens group, and the focal length of a composite lens unit(s) of some of the lens groups meet requirements defined as follows:

$$1.03 \leq BFw/(Fnow*Fw) \leq 1.2 \quad (31)$$

where BFw is a back focus, Fnow is an F-number at the wide-angle end, and Fw is a focal length of the entire optics at the wide-angle end.

According to a sixth aspect of the present invention, there is provided a wide-angle zoom lens having four groups of lens pieces which are the leading or foremost 1st lens group of negative refractivity closest to objects, the succeeding 2nd lens group of positive refractivity, the third lens group of negative refractivity, and the trailing 4th lens group of positive refractivity arranged in this order to move each lens group to vary optical power; and intervals between the lens groups adjacent to each other, a focal length of each lens group, and the focal length of a composite lens unit(s) of some of the lens groups meet requirements defined as follows:

$$F23w/Fw \geq 12 \quad (32)$$

where F23w is a focal length of the composite lens unit of the 2nd and 3rd lens groups at the wide-angle end while Fw is the focal length of the entire optics at the wide-angle end.

According to a seventh aspect of the present invention, there is provided a wide-angle zoom lens having four groups of lens pieces which are the leading or foremost 1st lens group of negative refractivity closest to objects, the succeeding 2nd lens group of positive refractivity, the third lens group of negative refractivity, and the trailing 4th lens group of positive refractivity arranged in this order to move each lens group to vary optical power; and intervals between the lens groups adjacent to each other, a focal length of each lens group, and the focal length of a composite lens unit(s) of some of the lens groups meet requirements defined as follows:

$$F234w/(D12w) \geq 1.3 \qquad (33)$$

where F234w is a focal length of the composite lens unit of the 2nd, 3rd and 4th lens groups at the wide-angle end while D12w is a distance between the 1st and 2nd lens groups when set to infinity focus at the wide-angle end.

In the fifth aspect, it is preferred that the wide-angle zoom lens further satisfies the requirements as defined in the formula (32).

In the fifth and sixth aspects, it is preferred that the wide-angle zoom lenses further satisfy the requirements as defined in the formula (33).

In the fifth and sixth aspects, it is preferred that the wide-angle zoom lenses further satisfy requirements defined as follows:

$$F234w/(D12w*Fw) \geq 0.13 \qquad (34)$$

where F234w is a focal length of a composite lens unit of the 2nd, 3rd and 4th lens groups at the wide-angle end, D12w is a distance between the 1st and 2nd lens groups when it is set to infinity focus at the wide-angle end, and Fw is the focal length of the entire optics at the wide-angle end.

In the fifth and sixth aspects, it is preferred that the wide-angle zoom lenses further satisfy requirements defined as follows:

$$|F23w/F23t| \geq 2.0 \qquad (35)$$

where F23w is a focal length of the composite lens unit of the 2nd and 3rd lens groups at the wide-angle end while F23t is the focal length of the composite lens unit of the 2nd and 3rd lens groups at the telephoto end.

In the fifth and sixth aspects, it is preferred that the 1st lens group of negative refractivity includes a front subset of the lens pieces of negative refractive power and a rear subset of negative refractive power, and the rear subset of the 1st lens group are displaced for focusing from infinitely far point to near view.

According to a seventh aspect of the present invention, there is provided a wide-angle zoom lens having four groups of lens pieces which are the leading or foremost 1st lens group closest to objects and comprised of a front subset of the lens pieces Gr1A of negative refractive power and a rear subset of the lens pieces Gr1B of negative refractive power, the succeeding 2nd lens group of positive refractivity, the 3rd lens group of negative refractivity, and the trailing 4th lens group of positive refractivity arranged in this order to move each lens group to vary optical power. The rear subset Gr1B are displaced toward the objects for focusing from an infinitely far point to near view. The 2nd lens group has more than one lens pieces including the foremost lens piece of positive refractive power closer to the objects and the rearmost lens piece of negative refractive power closer to the imaging plane. The 4th lens group has also more than one lens pieces including the foremost lens piece of positive refractive power and the rearmost lens piece of negative refractive power, and at least one of the lens pieces in the 4th lens group has one or both of its opposite major surfaces shaped aspherical. The zoom lens meets requirements defined as follows:

$$0.15 \leq D1Sw/OVLw \leq 0.3 \qquad (41)$$

where D1Sw is a distance from the backmost surface closest to the imaging plane in the 1st lens group to the aperture stop when it is set to infinity focus at the wide-angle end, and OVLw is the overall length of the entire lens optics (the maximized extension from the front end surface closest to the objects to the backmost surface closest to the imaging plane) at the wide-angle end.

<Description of the Formulae>

The formula (11) is defined so as to ensure the angle of field as wide as 110 degrees or even wider and to reduce the effective aperture of the 1st lens group.

When the absolute value |f1b/f1a| in the formula (11) exceeds the lower limit, the front subset of the 1st lens group has its power (=a reciprocal of the focal length) diminished to make the angle of filed as wide as 110 degrees unachievable at the wide-angle end. When it is lower than the lower limit, it is further unfeasible to reduce the effective aperture of the 1st lens group, and various defects such as astigmatism and curvature of field are caused.

When the absolute value exceeds the upper limit as defined in the formula (1), the rear subset of the lens pieces in the 1st lens group has its power diminished to resultantly necessitate a greater displacement of the lens groups for focusing. When it is greater than the upper limit, the front subset of the 1st lens group and the lens groups used for focusing are likely to interfere with each other, and various defects such as spherical aberration and chromatic aberration are caused.

The formula (11) may be refined as in $4.0 \leq |f1b/f1a| 5.0$, so that the effects of the invention can be ensured as much.

The formula (12) and the formula (3) are determined to define an asphericity of the front-end surface of the front-end negative meniscus lens piece closest to the objective field. When the value θ25 exceeds the lower limit, the normal angle for the front-end surface of the front-end lens piece closest to the objective field is reduced in the center range from the optical axis of the mid point of the effective aperture to a perimeter radially 25% down from the optical axis, resulting in the curvature of field and the astigmatism being unavoidable at the wide-angle end because of beams incident upon the aspherical surface beyond the center 30% area to a perimeter radially 50% outward from the mid point of the effective aperture.

When the value θ25 exceeds the upper limit as defined in the formula (2), the front-end lens piece has its power diminished, resulting the angle of filed as wide as 110 degrees being unachievable at the wide-angle end. When it is greater than the upper limit, spherical aberration, distortion and the like are also caused.

If the formula (12) is refined as in $3.8 \leq θ25 \leq 5.2$, the effects of the invention can be ensured as much.

When the value θ100/θ25 exceeds the lower limit as defined in the formula (3), it is unavoidable at the wide-angle end to cause adverse effects of the astigmatism and the curvature of field around the outermost peripheral edge of the view field because of beams incident upon the aspherical surface at a perimeter radially 100% outward from the mid point of the effective aperture.

When the value θ100/θ25 exceeds the upper limit as defined in the formula (13), the front-end negative meniscus aspherical glass molded lens is hard to treat in manufacturing procedures. When higher than the upper limit, the astigmatism and the curvature of filed are caused.

Refining the formula (13) as in $5.3 \leq θ100/θ25 \leq 7.0$ enables the effects of the invention to be ensured as much.

The formula (14) is determined to define the maximum dimensions of the view field related to the focal length of the entire optics at the wide-angle end. When the value Ymax/Fw exceeds the lower limit as defined in the formula (14), various defects such as insufficient dimensions of the view field and an unsatisfactory angle of field of less than 110 degrees are caused.

If the formula (14) is refined as in $1.35 \leq Y_{max}/F_w \leq 1.45$, the effects of the invention can be ensured as much.

The formula (15) is determined to define a rate of radius of curvature of the rear surface of the front-end negative meniscus lens piece to the focal length of the 1st lens group. When the value G1R2/F1 exceeds the lower limit, the rear surface of the front-end lens piece has its radius of curvature enhanced, and the glass molded lens or the glass aspherical surface thus emphasized in asphericity is hard to treat in manufacturing operation. When lower than the lower limit, astigmatism, distortion, and the like are further caused.

When the value G1R2/F1 exceeds the upper limit as defined in the formula (5), the front-end lens piece has its power enhanced with radius of curvature of its front-end surface being increased, and in order to provide the angle of view as wide as 110 degrees at the wide-angle end, the angle of the line normal to the front-end surface is to be accelerated slowly in the vicinity of the optical axis till it's acceleration becomes abruptly rapid around and beyond a perimeter radially 30% down from the mid point of the effective aperture. As a result, it is unfeasible at the wide-angle end to compensate for adverse effects of curvature of field and astigmatism in the intermediate range between the center and the peripheral edge of the view field.

Refining the formula (15) as in $0.835 \leq G1R2/F1 \leq 0.9$ enables the effects of the invention to be ensured as much.

The wide-angle zoom lens according to the present invention provides the angle of filed as wide as 110 degrees or ever wider at the wide-angle end and is capable of appropriately compensate for both the curvature of field and the astigmatism. Also, the wide-angle zoom lens according to the present invention, meeting the requirements as defined in the aforementioned formulae, has an adequate asphericity and/or an adequate surface shaping for the lens pieces in the 1st lens group and a well-balanced optical power in the same, so as to successfully downsize the 1st lens group and the remaining lens groups used for focusing.

The formula (21) defines a rate and a relative position of the focal length of the composite lens unit of the 1st, 2nd and 3rd lens groups with that of the 4th lens group at the wide-angle end. When the rate exceeds the lower limit as defined in the formula (21), the long back focus as desired is easy to attain although it is unfeasible to provide angle of view as wide as 110 degrees. When the rate exceeds the upper limit as defined in the formula (21), the angle of view as wide as 110 degrees is easily achievable unlike the long back focus unattainable as desired. Consequently, it is hard to compensate for comatic aberration and distortion aberration at the wide-angle end.

Refining the formula (21) as in $3.0 \leq (E4w-F123w)/F4 \leq 3.5$ enables the effects of the invention to be ensured as much.

The formula (22) defines the rate of the focal length of the composite lens unit of the 2nd and 3rd lens groups with that of the 1st lens group at the wide-angle end. When the rate exceeds the lower limit as defined in the formula (22), the composite lens unit of the 2nd and 3rd lens groups has its power (=reciprocal of the focal length) enhanced, which results in the long back focus as desired being unattainable. Rather, this brings about a reduction in power of the 1st lens group, and this necessitates an increase in effective aperture of the 1st lens group in order to attain the angle of view as wide as 110 degrees, which turns downsizing of the 1st lens group to be unfeasible.

The formula (22), refined as in $0.7 \leq (-F123w)/F4 \leq 0.75$, ensures the effects of the invention as much.

The formula (23), refined as in $30 \leq Fw*(E4w-F123w)/F4 \leq 35$, ensures the effects of the invention as much.

The formula (24), refined as in $8.0 \leq F23w/(-F1) \leq 12$, ensures the effects of the invention as much.

In this way, the wide-angle zoom lens according to the present invention attains the angle of view as wide as 110 degrees or even wider at the wide-angle end and provides the zoom ratio more than 2 and the back focus 3.7 times as long as the focal length at the wide-angle end.

The formula (31) defines relations of back focus with F-number at the wide-angle end. When the value of BFw/(Fnow·Fw) exceeds the upper limit as defined in the formula (1), various types of aberration such as spherical aberration and astigmatism are caused. When the value exceeds the lower limit, it is unfeasible to attain well-balanced adjustment among various factors such as back focus, angle of view, and brightness.

Refining the formula (31) as in $1.03 \leq BFw/(Fnow*Fw) \leq 1.1$ assuredly enables the invention to take effect as much.

The formula (32) defines a rate of the focal length of the composite lens unit of the 2nd and 3rd lens groups at the wide-angle end to the focal length of the entire optics at the wide-angle end. When the rate exceeds the lower limit as defined in the formula (32), the composite lens unit of the 2nd and 3rd lens groups has its power (=reciprocal of the focal length) enhanced. As a consequence, a long back focus is unattainable at the wide-angle end. When the rate exceeds the lower limit as defined in the formula (32), various types of aberration such as spherical aberration, astigmatism, and the like are caused.

The formula (32), when refined as in $13 \leq F23w/Fw \leq 15$, assuredly enables the invention to take effect as much.

The formula (33) defines the focal length of the composite lens unit of the 2nd, 3rd and 4th lens groups at the wide-angle end in relation with the distance between the 1st and 2nd lens groups at the wide-angle end. When the formula (33) exceeds the lower limit as defined in the formula (3), various types of aberration such as spherical aberration, comatic aberration, and the like are caused.

Refining the formula (33) as in $1.3 \leq F234w/(D12w) \leq 1.5$ assuredly enables the invention to take effect as much.

The formula (34) defines the focal length of the composite lens unit of the 2nd, 3rd and 4th lens groups at the wide-angle end in relation with the focal length of the entire optics at the wide-angle end. When the value exceeds the lower limit as defined in the formula (34), it is hard to attain a back focus as long as 3.7 times or more of the focal length at the wide-angle end. When the value exceeds the lower limit as defined in the formula (4), various types of aberration such as spherical aberration, comatic aberration, and the like are caused.

The formula (34), when refined as in $0.13 \leq F234w/(D12w*Fw) \leq 0.15$, assuredly enables the invention to take effect as much.

The formula (35) defines a rate of the focal length of the composite lens unit of the 2nd and 3rd lens groups at the wide-angle end to that at the telephoto end. When the rate exceeds the lower limit as defined in the formula (35), the attempts to downsize the zoom lens and simultaneously to conduct zooming with 2.2 or higher ratio are unattainable. When the rate exceeds the lower limit as defined in the formula (5), various types of aberration such as spherical aberration, astigmatism and the like are caused.

The formula (35), when refined as in $2.0 \leq |F23w/F23t| \leq 3.0$, assuredly enables the invention to take effect as much.

The wide-angle zoom lens according to the present invention ensures angle of view as wide as 105 degrees at the wide-angle end and still attains zoom ratio as high as 2 or even higher and back focus 3.7 times or more as long as the focal length at the wide-angle end.

In order to ensure angle of view as wide as 110 degrees or even wider and still keep the 1st and 4th lens groups sufficiently reduced in effective aperture, the inventors deliberately determine the requirements as expressed in the formula (41).

When the value of the term D1Sw/OVLw exceeds the lower limit as defined in the formula (41), downsizing the 1st lens group is facilitated whereas the 4th lens group has its effective aperture obliged to increase, which in turn results in principal light beams incident upon the outermost perimeter of the 4th lens group being prone to be refracted at insufficient angle toward the imaging plane. Such deviation from the lower limit defined in the formula causes the incident beams to be directed onto the imaging plane at an excessively small angle, leading to deviation from the optimum angle of rays incident upon charge coupled devices.

When the value exceeds the upper limit, downsizing the 4th lens group is facilitated whereas the 1st lens group is unfeasible to still keep reduced in dimensions. Deviation from the upper limit defined in the formula further causes various types of aberration such as spherical aberration, astigmatism, distortion and the like.

Refining the formula as in $0.2 \leq D1Sw/OVLw \leq 0.25$ enables the invention to be effected as much.

<Arrangement of the 2nd Lens Group in the Seventh Aspect>

To attain the reduced effective aperture in the 4th lens group, the 2nd lens group is designed to have more than one lens pieces, including the foremost one of positive refractive power closer to the objects than any other and the backmost one of negative refractive power closer to the imaging plane. Specifically, as depicted in FIG. 13(A), in an arrangement where a positive power lens unit 100 is in the forward location (closer to the objects) while a negative power lens unit 110 is in the backward location (closer to the imaging plane), converged incident beams L, when reaching a backward area of the optics, are transmitted at a lower level, which brings about reduction in an outer diameter of the lens unit in the backward location. On the contrary, as depicted in FIG. 13(B), in another arrangement where the negative power lens unit 110 is in the forward location (closer to the objects) while the positive power lens unit 100 is in the backward location (closer to the imaging plane), the converged incident beams L, when reaching the backward area of the optics, are transmitted at a higher level, which necessitates increase in the outer diameter of the lens unit in the backward location.

<Arrangement of the 4th Lens Group in the Seventh Aspect>

In order to keep the effective aperture sufficiently small and compensate for chromatic aberration in the 4th lens group, the 4th lens group preferably have two or more positive power lens pieces and two or more negative power lens pieces, and such multi-lens arrangement has one of the positive power lens pieces located in the front end position closer to the objects than any other and one of the negative power lens pieces located in the backmost position closer to the imaging plane. Comatic aberration and distortion aberration are coped by forming one or more of the surfaces of the lens pieces in aspherical shape in the 4th lens group.

The wide-angle zoom lens according to the present invention ensures angle of view as wide as 105 degrees at the wide-angle end and still attains zoom ratio as high as 2 or even higher and back focus 3.7 times or more as long as the focal length at the wide-angle end.

BRIEF DESCRIPTION OF THE DRAWINGS

FIG. 8 is a diagram illustrating spherical aberration, astigmatism, aberration of distortion, and chromatic aberration of magnification caused in the exemplary wide-angle zoom lens in FIG. 7 at the wide-angle end;

FIG. 9 is a diagram illustrating spherical aberration, astigmatism, aberration of distortion, and chromatic aberration of magnification caused in the exemplary wide-angle zoom lens at the telephoto end;

FIG. 11 is a diagram illustrating spherical aberration, astigmatism, aberration of distortion, and chromatic aberration of magnification caused in the exemplary wide-angle zoom lens in FIG. 10 at the wide-angle end; and FIG. 12 is a diagram illustrating spherical aberration, astigmatism, aberration of distortion, and chromatic aberration of magnification caused in the exemplary wide-angle zoom lens at the telephoto end.

EMBODIMENTS FOR CARRYING OUT THE INVENTION

The present invention will now be described in detail in the context of preferred embodiments and various types of aberration caused therein.

<Embodiment 1>

Figure 1:
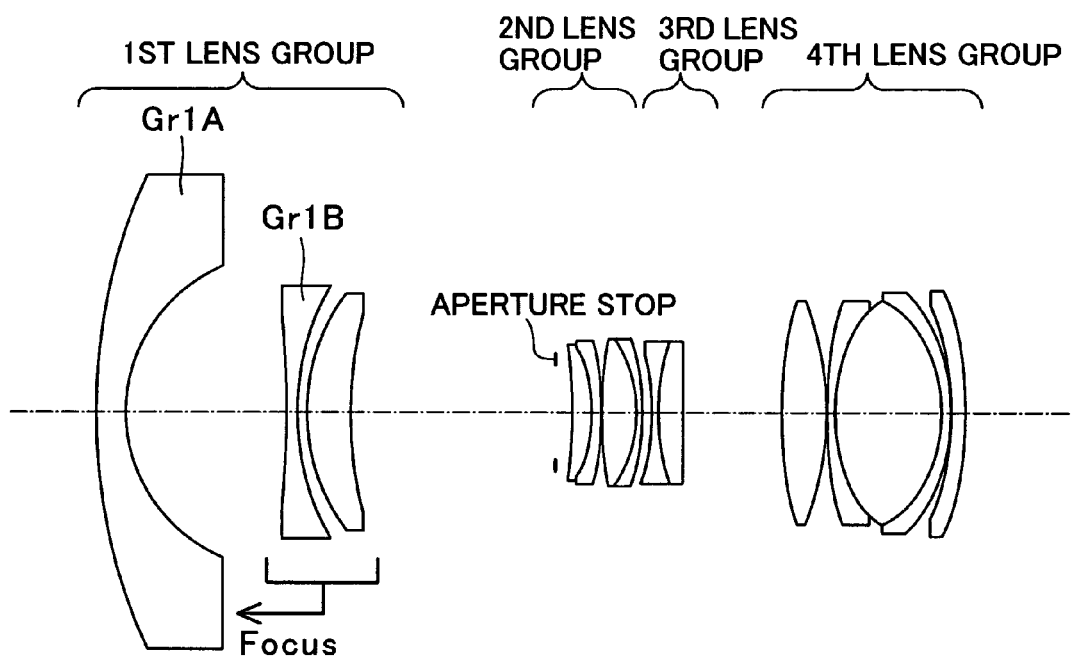
FIG. 1 is a diagram illustrating an optical arrangement of a first preferred embodiment of a wide-angle zoom lens according to the present invention.

A first preferred embodiment of a wide-angle zoom lens according to the present invention is configured as in the optical arrangement depicted in FIG. 1. Each of lens pieces in the zoom lens has front and rear major surfaces S with radius of curvature denoted by R (in millimeters or mm), center thickness plus clearance filled with air contiguous to the succeeding lens piece as denoted by D (in millimeters or mm), refractive index Nd and Abbe number ABV for the d-line to each lens piece, and these values are shown in the following table.

Focal Length 10.29~15.5952~23.3915
FNO 3.6~4.15~4.6
2ω 111.4~85.4~62.6

| S | R | D | Nd | ABV |
|---|---|---|---|---|
| 1 ASPH | 90.9531 | 3.0000 | 1.74690 | 49.22 |
| 2 ASPH | 13.3000 | 17.4155 | | |
| 3 | −347.3422 | 1.1000 | 1.83944 | 42.72 |
| 4 | 27.7720 | 0.2500 | 1.51700 | 49.96 |
| 5 ASPH | 32.9778 | 0.8225 | | |
| 6 | 20.1105 | 4.8835 | 1.70444 | 30.05 |
| 7 | 45.1356 | D7 | | |
| Aperture Stop | 0.0000 | 1.6767 | | |
| 9 | −70.4744 | 2.4522 | 1.69416 | 31.16 |
| 10 | −14.1708 | 0.8000 | 1.88815 | 40.80 |
| 11 | −37.7808 | 0.1500 | | |
| 12 | 33.1737 | 3.7557 | 1.59142 | 61.25 |
| 13 | −14.2611 | 0.8000 | 1.81184 | 33.27 |
| 14 | −28.6675 | D14 | | |
| 15 | −29.8948 | 0.8000 | 1.80831 | 46.50 |
| 16 | 23.7239 | 2.5836 | 1.93325 | 20.88 |
| 17 | 240.6296 | D17 | | |
| 18 | 40.3874 | 4.8044 | 1.49845 | 81.61 |
| 19 | −35.6422 | 0.1500 | | |
| 20 | 49.4590 | 0.8000 | 1.91048 | 31.31 |
| 21 | 17.3129 | 11.6398 | 1.49845 | 81.61 |
| 22 | −14.5130 | 0.8000 | 1.91048 | 31.31 |
| 23 | −20.5428 | 0.2000 | | |
| 24 ASPH | −34.8009 | 0.2000 | 1.51700 | 49.96 |
| 25 | −31.4677 | 1.3000 | 1.83930 | 37.34 |
| 26 | −38.5550 | | | |

| | Focal Length | | |
|---|---|---|---|
| Variable Clearance | 10.2935 | 15.5952 | 23.3915 |
| D7 | 21.974 | 11.228 | 4.641 |
| D14 | 1.000 | 7.723 | 14.519 |
| D17 | 10.742 | 5.812 | 0.900 |

ASPH denotes an aspherical surface and is expressed as in the following formula:

$$z = \frac{y^2}{R(1 + \sqrt{1 - (1+K)y/R^2})^2} + Ay^4 + By^6 + Cy^8 + Dy^{10} \quad (6)$$

where z is a depth of an aspherical surface, y is a height, R is a paraxial curvature radius, and K, A, B, C and D are coefficients of the aspherical surfaces, respectively.

Coefficients of the Aspherical Surfaces
Surface #1
K: −21.703831
A: 0.137414E-04 B: −0.284986E-07 C: 0.473022E-10
D: −0.418229E-13 E: 0.157785E-16
Surface #2
K: −0.864034
A: 0.743621E-06 B: 0.628016E-07 C: −0.187456E-09
D: 0.315824E-12 E: 0.773230E-15
Surface #5
K: 1.512115
A: 0.292118E-04 B: −0.127860E-06 C: 0.842074E-09
D: −0.326732E-11 E: 0.634290E-14
Surface #24
K: −0.150085
A: −0.101962E-04 B: 0.106224E-07 C: 0.235188E-10
D: 0.177170E-12

Each lens group of the first preferred embodiment of the wide-angle zoom lens provides a focal length as given below:

| Focal Length of the Lens Groups | |
|---|---|
| 1st Lens Group | −15.253 |
| 2nd Lens Group | 32.183 |
| 3rd Lens Group | −38.7101 |
| 4th Lens Group | 32.558 |
| Gr1a: | −21.94 |
| Gr1b: | −104.94 |
| Wide-Angle End | |
| Composite Focal Length of the 2nd and 3rd Lens groups | 148.639 |
| Composite Focal Length of the 2nd, 3rd and 4th Lens Groups | 31.483 |
| Composite Focal Length of the 1st, 2nd and 3rd Lens Groups | −23.355 |
| Interval between Primary Points of Allied 1st, 2nd, and 3rd Lens Groups and the stand-alone 4th Lens Group | 83.074 |
| Total Length of all the Lens Optics | 94.1 |
| Telephoto End | |
| Composite Focal Length of the 2nd and 3rd Lens Groups | 56.887 |

The 11th surface of the first preferred embodiment of the wide-angle zoom lens is shaped in the following manner:

| Effective Aperture | Angle of Normal Line to #11 Surface |
|---|---|
| 1.2 | 0.76 |
| 2.4 | 1.5435 |
| 3.6 | 2.3717 |
| 4.8 | 3.2612 |
| 6 | 4.2224 |
| 7.2 | 5.2589 |
| 8.4 | 6.368 |
| 9.6 | 7.542 |
| 10.8 | 8.7704 |
| 12 | 10.0425 |
| 13.2 | 11.3506 |
| 14.4 | 12.6918 |
| 15.6 | 14.0701 |
| 16.8 | 15.4955 |
| 18 | 16.9831 |
| 19.2 | 18.5502 |
| 20.4 | 20.2133 |
| 21.6 | 21.9861 |
| 22.8 | 23.8818 |
| 24 | 25.9204 |

The terms in the formulas applied to the first embodiment of the wide-angle zoom lens are given as follows:

| | |
|---|---|
| $|f1b/f1a|=4.783$ | Formula (11) |
| $\theta25=4.22$ | Formula (12) |
| $\theta100/\theta25=6.142$ | Formula (13) |
| $Ymax/Fw=1.409$ | Formula (14) |
| $G1R2/F1=0.872$ | Formula (15) |
| $(E4w-F123w)/F4=3.269$ | Formula (21) |
| $(-F123w)/F4=0.717$ | Formula (22) |
| $Fw*(E4w-F123w)/F4=33.648$ | Formula (23) |
| $F23w/(-F1)=9.745$ | Formula (24) |
| $BFw/(Fnow \cdot Fw)=1.05$ | Formula (31) |
| $F23w/Fw=14.44$ | Formula (32) |

$F234w/(D12w)=1.433$     Formula (33)

$F234w/(D12w \cdot Fw)=0.139$     Formula (34)

$F23w/F23t=2.613$     Formula (35)

$D1Sw/OVLw=0.234$     Formula (41)

Figure 2:
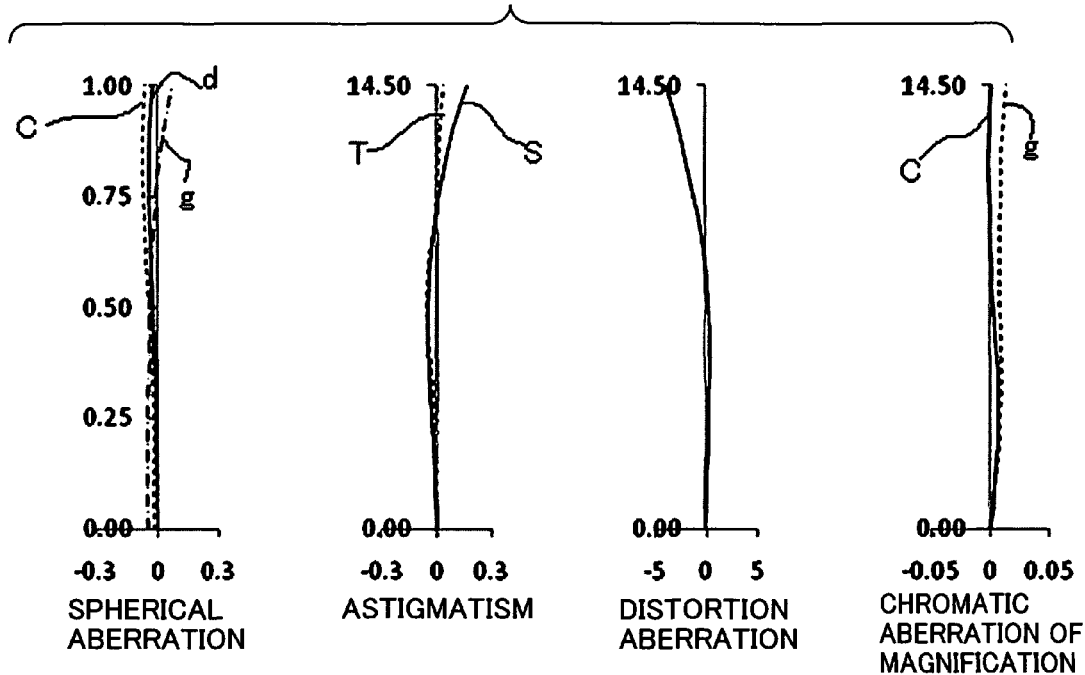
FIG. 2 is a diagram illustrating spherical aberration, astigmatism, aberration of distortion, and chromatic aberration of magnification caused in the exemplary wide-angle zoom lens in FIG. 1 at the wide-angle end.
Figure 3:
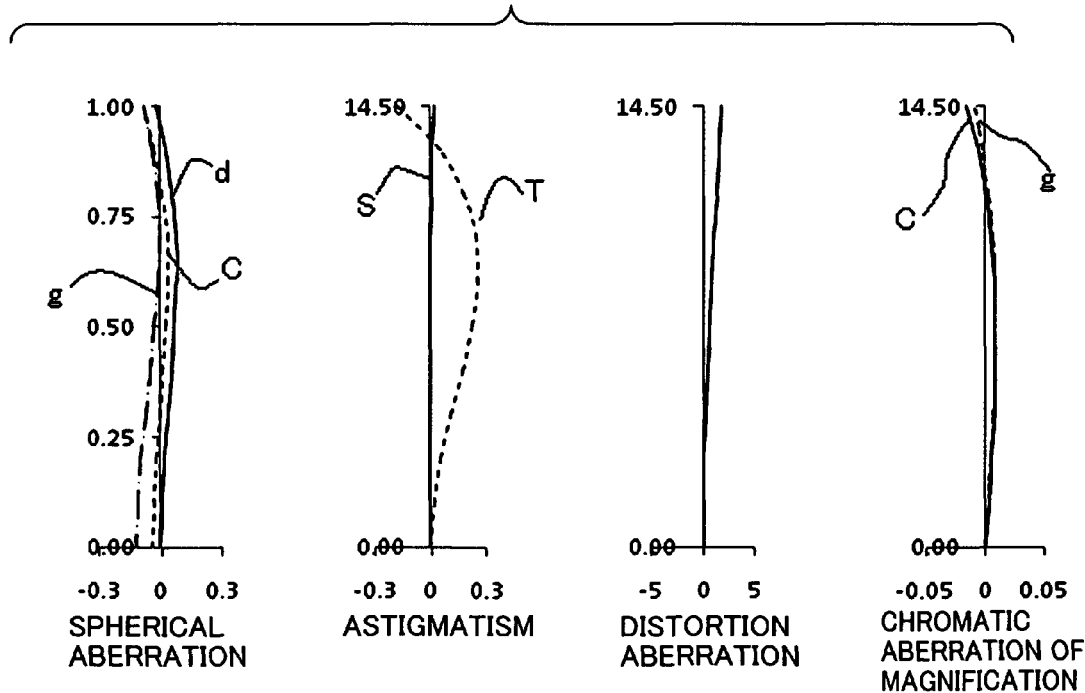
FIG. 3 is a diagram illustrating spherical aberration, astigmatism, aberration of distortion, and chromatic aberration of magnification caused in the exemplary wide-angle zoom lens at the telephoto end.

Arrangement of the 2nd Lens Group
   Positive-Negative & Negative-Positive
Arrangement of the 4th Lens Group
   Positive, Negative-Positive-Negative, & Negative FIG. 2 depicts spherical aberration, astigmatism, aberration of distortion, and chromatic aberration caused in the exemplary wide-angle zoom lens at the wide-angle end. FIG. 3 illustrates the similar types of aberration caused in the exemplary wide-angle zoom lens at the telephoto end.

<Embodiment 2>

Figure 4:
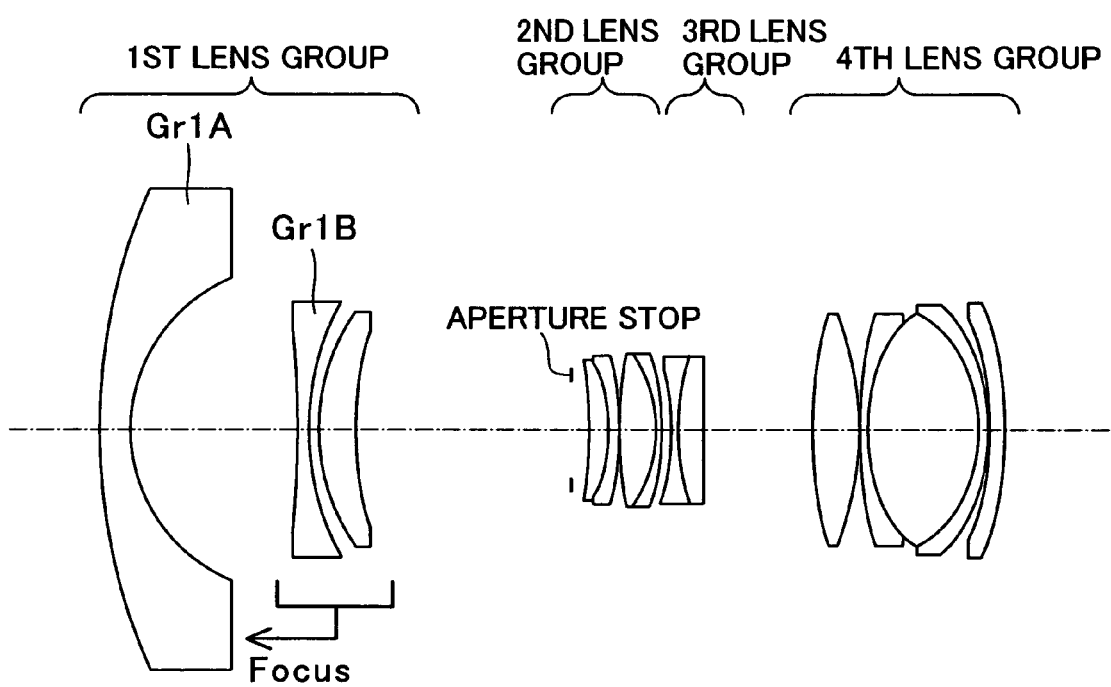
FIG. 4 is a diagram illustrating another optical arrangement of a second preferred embodiment of the wide-angle zoom lens according to the present invention.

Another embodiment or a second embodiment of the wide-angle zoom lens according to the present invention is configured as in an optical arrangement depicted in FIG. 4. Each of lens pieces in the zoom lens has front and rear major surfaces S with radius of curvature denoted by R (in millimeters or mm), center thickness plus clearance filled with air contiguous to the succeeding lens piece as denoted by D (in millimeters or mm), refractive index Nd and Abbe number ABV for the d-line to each lens piece, and these values are shown in the following table.

Focal Length 10.29~15.60~23.39
FNO 3.6~4.15~4.6
2ω 111.36~85.71~62.88

| S | R | D | Nd | ABV |
|---|---|---|---|---|
| 1 ASPH | 98.2835 | 3.0000 | 1.74330 | 49.22 |
| 2 ASPH | 13.3000 | 17.0621 | | |
| 3 | −375.8017 | 1.1000 | 1.83481 | 42.72 |
| 4 | 26.2992 | 0.2500 | 1.51460 | 49.96 |
| 5 ASPH | 31.3128 | 0.8586 | | |
| 6 | 19.4744 | 4.2180 | 1.69895 | 30.05 |
| 7 | 44.8215 | D7 | | |
| 8 | 0.0000 | 1.6811 | | |
| 9 | −69.6742 | 2.4945 | 1.68893 | 31.16 |
| 10 | −13.8558 | 0.8000 | 1.88300 | 40.80 |
| 11 | −37.5514 | 0.1500 | | |
| 12 | 33.6029 | 3.7863 | 1.58913 | 61.25 |
| 13 | −14.1772 | 0.8000 | 1.80610 | 33.27 |
| 14 | −28.4616 | D14 | | |
| 15 | −31.0253 | 0.8000 | 1.80420 | 46.50 |
| 16 | 23.9527 | 2.5703 | 1.92286 | 20.88 |
| 17 | 237.9034 | D17 | | |
| 18 | 41.0664 | 4.5125 | 1.49700 | 81.61 |
| 19 | −35.8367 | 0.1500 | | |
| 20 | 49.9837 | 0.9000 | 1.90366 | 31.31 |
| 21 | 17.1665 | 11.7603 | 1.49700 | 81.61 |
| 22 | −14.5000 | 1.1000 | 1.90366 | 31.31 |
| 23 | −21.0822 | 0.2000 | | |
| 24 ASPH | −50.4122 | 0.2000 | 1.51460 | 49.96 |
| 25 | −44.1195 | 1.8000 | 1.83400 | 37.34 |
| 26 | −53.8351 | | | |

| Variable Interval | Focal Length | | |
|---|---|---|---|
| Variable Clearance | 10.29 | 15.60 | 23.40 |
| D7 | 22.0922 | 11.2672 | 4.7266 |
| D14 | 0.9588 | 7.5245 | 14.2504 |
| D17 | 10.8553 | 5.8392 | 0.800 |

Coefficients of the Aspherical Surfaces

Surface #1
   K: −30.868200
   A: 0.147706E-04 B: −0.260370E-07 C: 0.377473E-10
   D: −0.300023E-13 E: 0.107463E-16

Surface #2
   K: −1.240297
   A: 0.207897E-04 B: 0.298769E-07 C: 0.267684E-09
   D: −0.163367E-11 E: 0.372598E-14

Surface #5
   K: 2.187192
   A: 0.313924E-04 B: −0.202309E-06 C: 0.158321E-08
   D: −0.733956E-11 E: 0.139279E-13

Surface #24
   K: −0.780042
   A: −0.942956E-05 B: 0.141825E-07 C: 0.244817E-10
   D: 0.194500E-12

Each lens group of the second preferred embodiment of the wide-angle zoom lens provides a focal length as given below:

| Focal Length of the Lens Groups | |
|---|---|
| 1st Lens Group | −15.085 |
| 2nd Lens Group | 32.5574 |
| 3rd Lens Group | −40.0929 |
| 4th Lens Group | 33.0051 |
| Gr1a | −21.0097 |
| Gr1b | −102.427 |
| Wide-Angle End | |
| Composite Focal Length of the 2nd and 3rd Lens groups | 140.206 |
| Composite Focal Length of the 2nd, 3rd and 4th Lens Groups | 31.626 |
| Composite Focal Length of the 1st, 2nd and 3rd Lens Groups | −24.033 |
| Interval between Primary Points of Allied 1st, 2nd, and 3rd Lens Groups and the stand-alone 4th Lens Group | 86.032 |
| Total Length of all the Lens Optics | 94.1 |
| Telephoto End | |
| Composite Focal Length of the 2nd and 3rd Lens Groups | 57.754 |

The 11th surface of the second preferred embodiment of the wide-angle zoom lens is shaped in the following manner:

| Effective Aperture | Angle of Normal Line to #11 Surface |
|---|---|
| 1.2 | 0.7038 |
| 2.4 | 1.4326 |
| 3.6 | 2.2094 |
| 4.8 | 3.0532 |
| 6 | 3.9779 |
| 7.2 | 4.9908 |
| 8.4 | 6.0933 |
| 9.6 | 7.2813 |
| 10.8 | 8.5466 |
| 12 | 9.879 |
| 13.2 | 11.2692 |
| 14.4 | 12.7107 |
| 15.6 | 14.2015 |
| 16.8 | 15.7456 |
| 18 | 17.3526 |
| 19.2 | 19.0367 |
| 20.4 | 20.8152 |
| 21.6 | 22.7073 |
| 22.8 | 24.7348 |
| 24 | 26.9257 |

The terms in the formulas applied to the second embodiment of the wide-angle zoom lens are given as follows:

$|f1b/f1a|=4.875$     Formula (11)

$\theta 25=3.978$     Formula (12)

$\theta 100/\theta 25=6.769$     Formula (13)

$Ymax/Fw=1.409$     Formula (14)

$G1R2/F1=0.882$     Formula (15)

| | |
|---|---|
| $(E4w-F123w)/F4=3.335$ | Formula (21) |
| $(-F123w)/F4=0.728$ | Formula (22) |
| $Fw*(E4w-F123w)/F4=34.327$ | Formula (23) |
| $F23w/(-F1)=9.294$ | Formula (24) |
| $BFw/(Fnow \cdot Fw)=1.05$ | Formula (31) |
| $F23w/Fw=13.621$ | Formula (32) |
| $F234w/(D12w)=1.432$ | Formula (33) |
| $F234w/(D12w \cdot Fw)=0.139$ | Formula (34) |
| $F23w/F23t=2.428$ | Formula (35) |
| $D1Sw/OVLw=0.235$ | Formula (41) |

Figure 5:
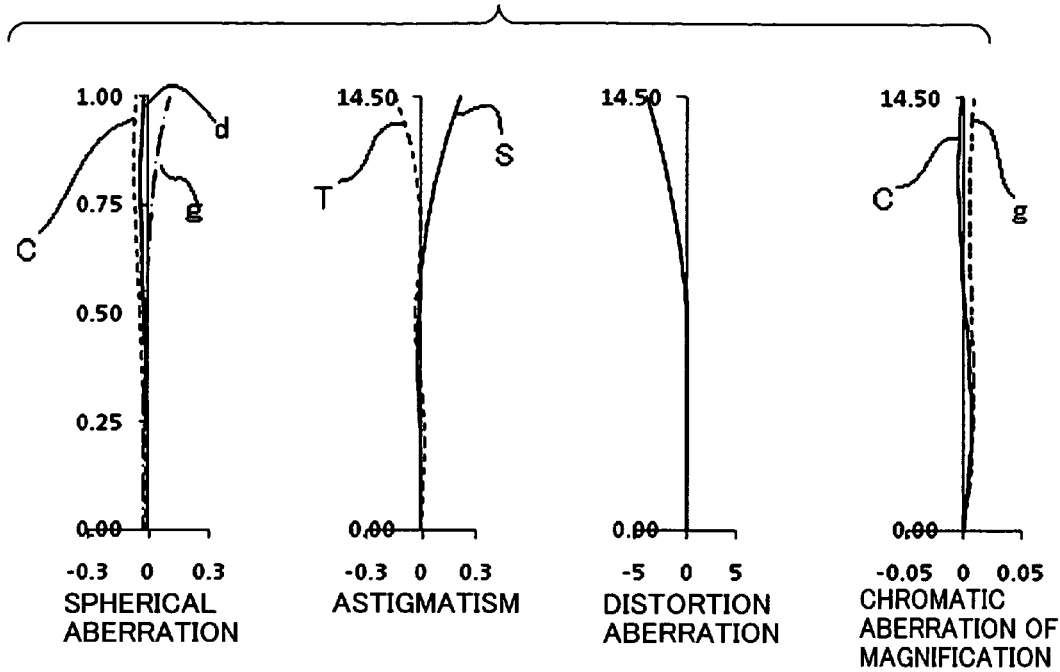
FIG. 5 is a diagram illustrating spherical aberration, astigmatism, aberration of distortion, and chromatic aberration of magnification caused in the exemplary wide-angle zoom lens in FIG. 4 at the wide-angle end.
Figure 6:
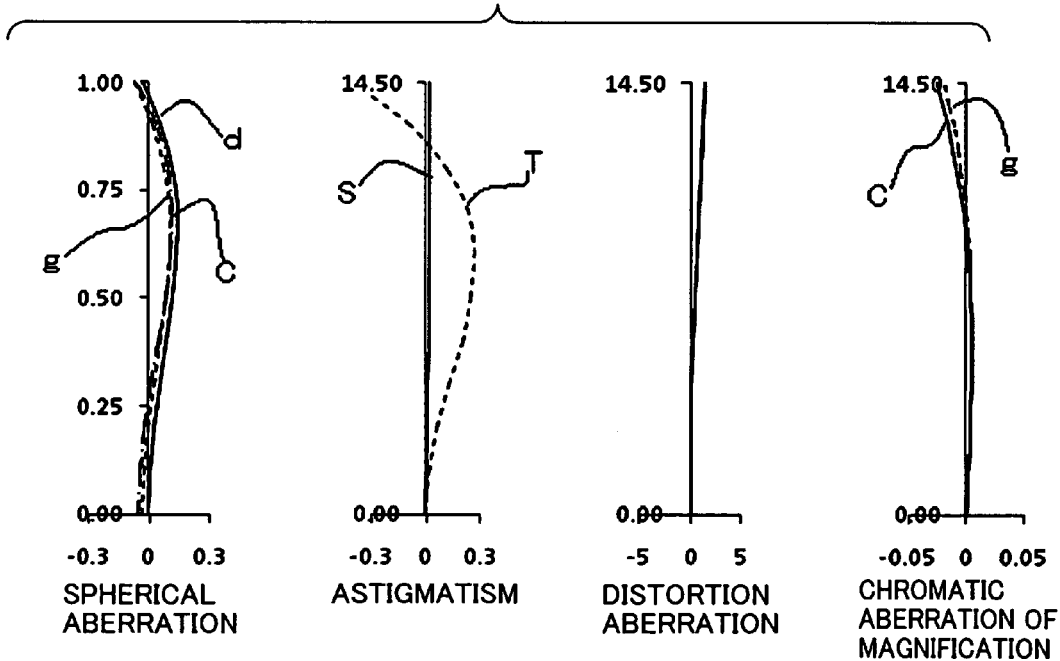
FIG. 6 is a diagram illustrating spherical aberration, astigmatism, aberration of distortion, and chromatic aberration of magnification caused in the exemplary wide-angle zoom lens at the telephoto end.

Arrangement of the 2nd Lens Group
  Positive-Negative 86 Negative-Positive
Arrangement of the 4th Lens Group
  Positive, Negative-Positive-Negative, 86 Negative FIG. 5 depicts spherical aberration, astigmatism, aberration of distortion, and chromatic aberration caused in the exemplary wide-angle zoom lens at the wide-angle end. FIG. 6 illustrates the similar types of aberration caused in the exemplary wide-angle zoom lens at the telephoto end.

<Embodiment 3>

Figure 7:
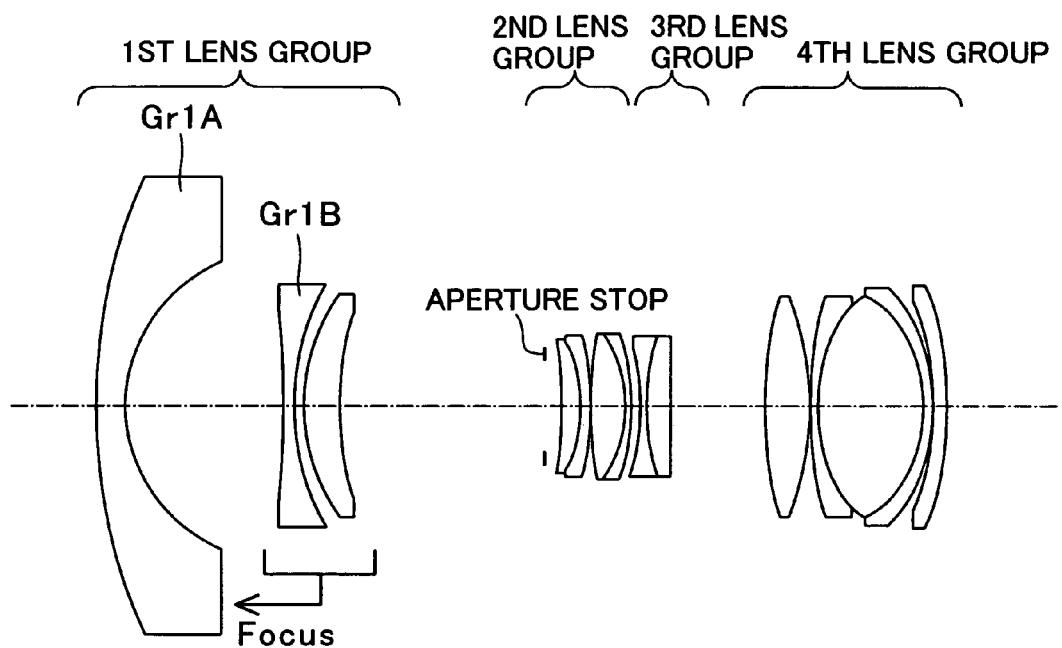
FIG. 7 is a diagram illustrating still another optical arrangement of a third preferred embodiment of the wide-angle zoom lens according to the present invention.

Still another embodiment or a third embodiment of the wide-angle zoom lens according to the present invention is configured as in an optical arrangement depicted in FIG. 7. Each of lens pieces in the zoom lens has front and rear major surfaces S with radius of curvature denoted by R (in millimeters or mm), center thickness plus clearance filled with air contiguous to the succeeding lens piece as denoted by D (in millimeters or mm), refractive index Nd and Abbe number ABV for the d-line to each lens piece, and these values are shown in the following table.

Focal Length 10.29~15.60~23.39
FNO 3.6~4.15~4.6
2ω 111.38~85.4~62.63

| S | R | D | Nd | ABV |
|---|---|---|---|---|
| 1 ASPH | 91.2892 | 3.0000 | 1.74330 | 49.22 |
| 2 ASPH | 13.3000 | 17.1746 | | |
| 3 | −550.1946 | 1.1000 | 1.83481 | 42.72 |
| 4 | 26.8414 | 0.2500 | 1.51460 | 49.96 |
| 5 ASPH | 31.7796 | 0.8380 | | |
| 6 | 19.6685 | 4.8948 | 1.69895 | 30.05 |
| 7 | 43.3886 | D7 | | |
| 8 | 0.0000 | 1.6759 | | |
| 9 | −70.7449 | 2.4534 | 1.68893 | 31.16 |
| 10 | −14.1775 | 0.8000 | 1.88300 | 40.80 |
| 11 | −37.9248 | 0.1500 | | |
| 12 | 33.1085 | 3.7574 | 1.58913 | 61.25 |
| 13 | −14.2673 | 0.7937 | 1.80610 | 33.27 |
| 14 | −28.7457 | D14 | | |
| 15 | −29.9856 | 0.8000 | 1.80420 | 46.50 |
| 16 | 23.8293 | 2.5887 | 1.92286 | 20.88 |
| 17 | 241.4124 | D17 | | |
| 18 | 40.5319 | 4.7504 | 1.49700 | 81.61 |
| 19 | −35.4136 | 0.1500 | | |
| 20 | 49.8255 | 0.9000 | 1.90366 | 31.31 |
| 21 | 17.3000 | 11.4746 | 1.49700 | 81.61 |
| 22 | −14.5000 | 0.9000 | 1.90366 | 31.31 |
| 23 | −20.5448 | 0.2000 | | |
| 24 ASPH | −34.3632 | 0.2000 | 1.51460 | 49.96 |
| 25 | −31.0708 | 1.3000 | 1.83400 | 37.34 |
| 26 | −37.8865 | | | |

| | Focal Length | | |
|---|---|---|---|
| Variable Clearance | 10.29 | 15.60 | 23.40 |
| D7 | 22.252 | 11.5339 | 4.8871 |
| D14 | 1.000 | 7.8478 | 14.5915 |
| D17 | 10.6954 | 5.7013 | 0.800 |

Coefficients of the Aspherical Surfaces
Surface #1
  K: −23.358778
  A: 0.138306E-04 B: −0.284728E-07 C: 0.473046E-10
  D: −0.418342E-13 E: 0.157340E-16
Surface #2
  K: −0.865462
  A: 0.617175E-06 B: 0.624054E-07 C: −0.184300E-09
  D: 0.328276E-12 E: 0.773908E-15
Surface #5
  K: 1.536049
  A: 0.293177E-04 B: −0.126814E-06 C: 0.844851E-09
  D: −0.324948E-11 E: 0.634290E-14
Surface #24
  K: −0.133768 KC: 100
  A: −0.102523E-04 B: 0.105589E-07 C: 0.225709E-10
  D: 0.159981E-12

Each lens group of the third preferred embodiment of the wide-angle zoom lens provides a focal length as given below:

| Focal Length of the Lens Groups | |
|---|---|
| 1st Lens Group | −15.297 |
| 2nd Lens Group | 32.268 |
| 3rd Lens Group | −38.818 |
| 4th Lens Group | 32.560 |
| Gr1a | −21.294 |
| Gr1b | −106.239 |
| Wide-Angle End | |
| Composite Focal Length of the 2nd and 3rd Lens groups | 148.971 |
| Composite Focal Length of the 2nd, 3rd and 4th Lens Groups | 31.486 |
| Composite Focal Length of the 1st, 2nd and 3rd Lens Groups | −23.429 |
| Interval between Primary Points of Allied 1st, 2nd, and 3rd Lens Groups and the stand-alone 4th Lens Group | 83.241 |
| Total Length of all the Lens Optics | 94.0988 |
| Telephoto End | |
| Composite Focal Length of the 2nd and 3rd Lens Groups | 56.936 |

The 11th surface of the third preferred embodiment of the wide-angle zoom lens is shaped in the following manner:

| Effective Aperture | Angle of Normal Line to #11 Surface |
|---|---|
| 1.2 | 0.7571 |
| 2.4 | 1.5375 |
| 3.6 | 2.362 |
| 4.8 | 3.247 |
| 6 | 4.2029 |
| 7.2 | 5.2337 |
| 8.4 | 6.3369 |
| 9.6 | 7.5051 |
| 10.8 | 8.7285 |
| 12 | 9.9969 |
| 13.2 | 11.3031 |
| 14.4 | 12.6449 |
| 15.6 | 14.0265 |
| 16.8 | 15.4584 |
| 18 | 16.9558 |
| 19.2 | 18.5359 |
| 20.4 | 20.2145 |
| 21.6 | 22.0044 |
| 22.8 | 23.9168 |
| 24 | 25.9691 |

The terms in the formulas applied to the third embodiment of the wide-angle zoom lens are given as follows:

|f1b/f1a|=4.989                    Formula (11)

θ25=4.203                          Formula (12)

θ100/θ25=6.179                     Formula (13)

Ymax/Fw=1.409                      Formula (14)

G1R2/F1=0.869                      Formula (15)

(E4w−F123w)/F4=3.276               Formula (21)

(−F123w)/F4=0.720                  Formula (22)

Fw*(E4w−F123w)/F4=33.723           Formula (23)

F23w/(−F1)=9.739                   Formula (24)

BFw/(Fnow·Fw)=1.05                 Formula (31)

F23w/Fw=14.472                     Formula (32)

F234w/(D12w)=1.415                 Formula (33)

F234w/(D12w·Fw)=0.137              Formula (34)

F23w/F23t=2.616                    Formula (35)

D1Sw/OVLw=0.236                    Formula (41)

Arrangement of the 2nd Lens Group
   Positive-Negative & Negative-Positive
Arrangement of the 4th Lens Group
   Positive, Negative-Positive-Negative, & Negative FIG. 8 depicts spherical aberration, astigmatism, aberration of distortion, and chromatic aberration caused in the exemplary wide-angle zoom lens at the wide-angle end. FIG. 9 illustrates the similar types of aberration caused in the exemplary wide-angle zoom lens at the telephoto end.

<Embodiment 4>

Figure 10:
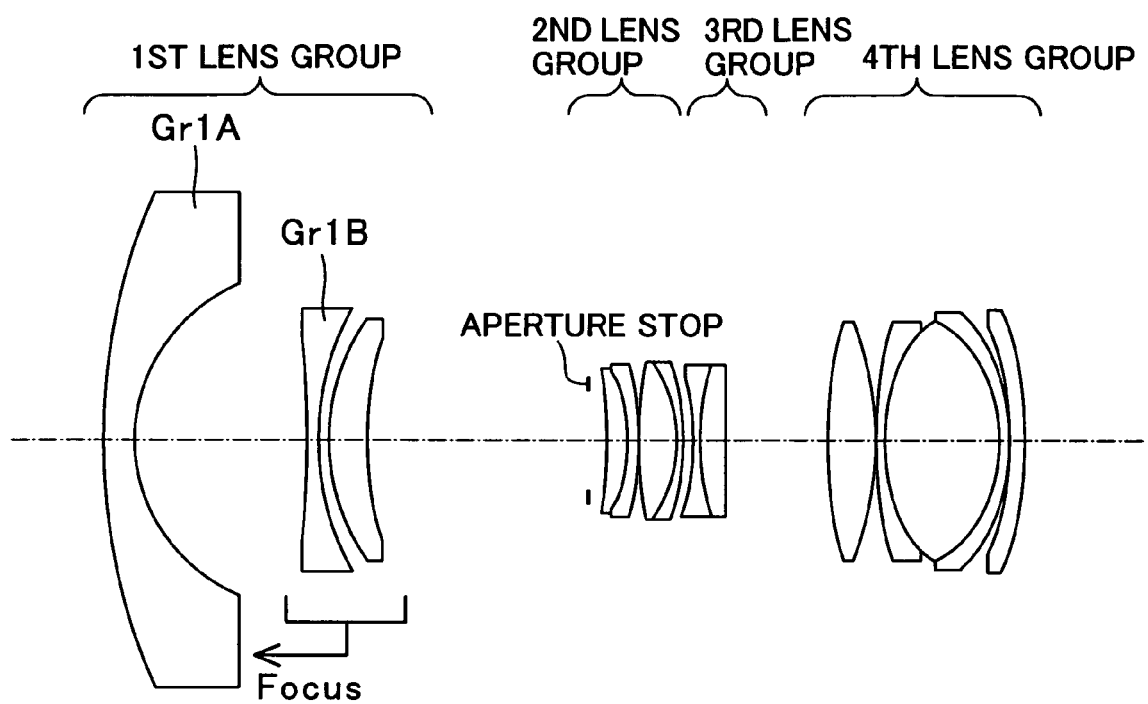
FIG. 10 is a diagram illustrating further another optical arrangement of a fourth preferred embodiment of the wide-angle zoom lens according to the present invention.
Figure 13:
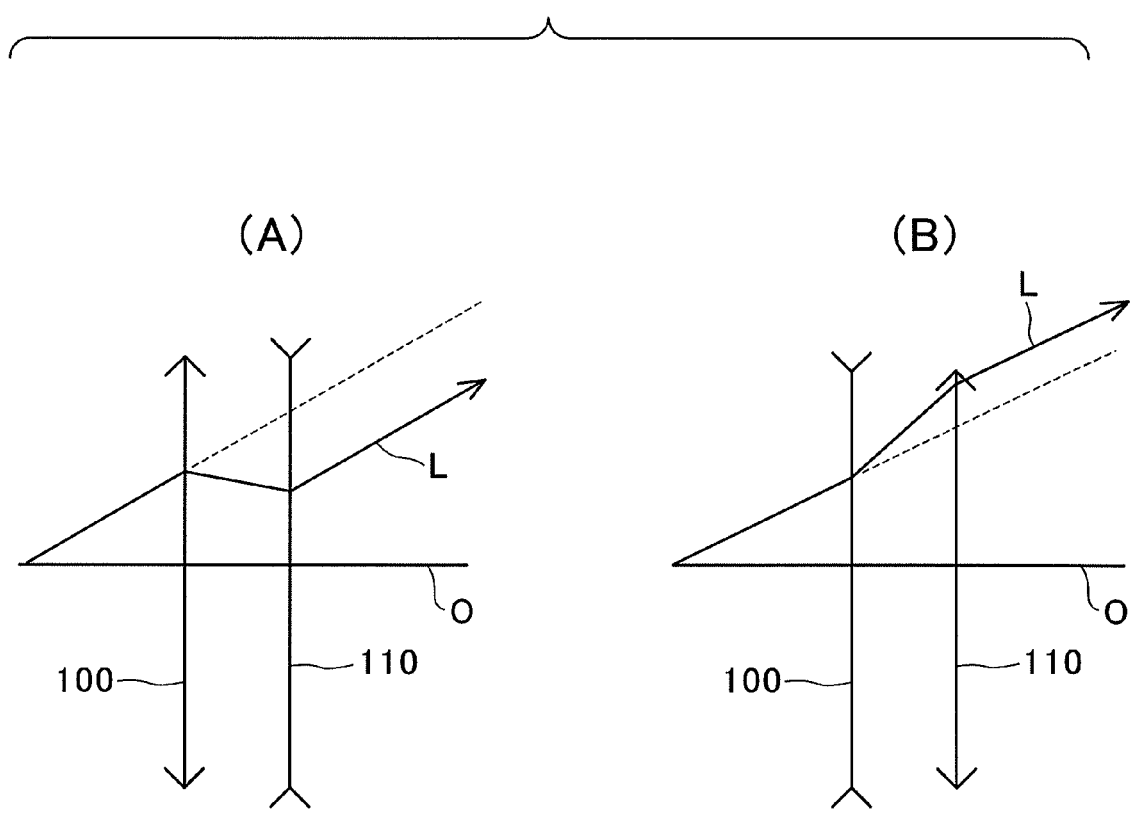
FIG. 13A shows an arrangement where a positive power lens unit is in the forward location while a negative power lens unit is in the backward location.
FIG. 13B shows an arrangement where the negative power lens unit is in the forward location while the positive power lens is in the backward location.

Further another embodiment or a fourth embodiment of the wide-angle zoom lens according to the present invention is configured as in an optical arrangement depicted in FIG. 10. Each of lens pieces in the zoom lens has front and rear major surfaces S with radius of curvature denoted by R (in millimeters or mm), center thickness plus clearance filled with air contiguous to the succeeding lens piece as denoted by D (in millimeters or mm), refractive index Nd and Abbe number ABV for the d-line to each lens piece, and these values are shown in the following table.

Focal Length 10.295~15.598~23.393
FNO 3.6~4.15~4.6
2ω 111.42~85.5~62.84

| S | R | D | Nd | ABV |
|---|---|---|---|---|
| 1 ASPH | 72.8710 | 3.0000 | 1.74330 | 49.22 |
| 2 ASPH | 12.9000 | 16.2015 | | |
| 3 | 770.1839 | 1.1000 | 1.88300 | 40.80 |
| 4 | 26.0522 | 0.3000 | 1.53610 | 41.21 |
| 5 ASPH | 30.6791 | 1.1966 | | |
| 6 | 20.4544 | 4.7353 | 1.69895 | 30.05 |
| 7 | 43.9685 | D7 | | |
| 8 | 0.0000 | 1.5074 | | |
| 9 | −68.4574 | 2.5124 | 1.68893 | 31.16 |
| 10 | −12.6110 | 1.7924 | 1.88300 | 40.80 |
| 11 | −37.3079 | 0.1500 | | |
| 12 | 34.8661 | 3.7882 | 1.58913 | 61.25 |
| 13 | −13.8945 | 0.8000 | 1.80610 | 33.27 |
| 14 | −26.8129 | D14 | | |
| 15 | −30.4122 | 0.8000 | 1.77250 | 49.62 |
| 16 | 20.1071 | 2.8524 | 1.84666 | 23.78 |
| 17 | 292.4999 | D17 | | |
| 18 | 45.2832 | 4.3580 | 1.49700 | 81.61 |
| 19 | −36.2850 | 0.1500 | | |
| 20 | 48.9769 | 0.9000 | 1.90366 | 31.31 |
| 21 | 17.4000 | 12.2843 | 1.49700 | 81.61 |
| 22 | −14.3000 | 1.1000 | 1.90366 | 31.31 |
| 23 | −20.2760 | 0.2000 | | |
| 24 ASPH | −37.3436 | 0.3500 | 1.51460 | 49.96 |
| 25 | −32.4182 | 1.5000 | 1.58144 | 40.89 |
| 26 | −44.7821 | | | |

| | Focal Length | | |
|---|---|---|---|
| Variable Clearance | 10.295 | 15.598 | 23.393 |
| D7 | 21.1006 | 10.4692 | 3.7599 |
| D14 | 0.8270 | 7.7520 | 14.2056 |
| D17 | 11.0939 | 5.8381 | 0.800 |

Coefficients of the Aspherical Surfaces

Surface #1
 K: −4.855874
 A: 0.147578E-04 B: −0.354016E-07 C: 0.454072E-10
 D: −0.116025E-13 E: 0.227158E-16 F: −0.308920E-19
 G: −0.677424E-22 H: −0.335578E-25
 J: 0.137873E-27

Surface #2
 K: −1.110553
 A: 0.277891E-04 B: 0.404370E-07 C: 0.612679E-10
 D: 0.362235E-12 E: −0.110342E-13 F: 0.528104E-17
 G: 0.320816E-18 H: 0.145731E-21
 J: −0.347259E-23

Surface #5
 K: 0.335030
 A: 0.226449E-04 B: −0.966072E-07 C: 0.176373E-09
 D: 0.114032E-12 E: 0.138279E-14

Surface #24
 K: −0.608663
 A: −0.983362E-05 B: 0.214587E-07 C: −0.114789E-09
 D: 0.130510E-11 E: −0.267583E-14

Each lens group of the fourth preferred embodiment of the wide-angle zoom lens provides a focal length as given below:

| Focal Length of the Lens Groups | |
|---|---|
| 1st Lens Group | −15.199 |
| 2nd Lens Group | 32.3369 |
| 3rd Lens Group | −40.4942 |
| 4th Lens Group | 33.2409 |
| Gr1a | −21.5478 |
| Gr1b | −95.6574 |
| Wide-Angle End | |
| Composite Focal Length of the 2nd and 3rd Lens groups | 143.052 |
| Composite Focal Length of the 2nd, 3rd and 4th Lens Groups | 31.312 |
| Composite Focal Length of the 1st, 2nd and 3rd Lens Groups | −24.561 |
| Interval between Primary Points of Allied 1st, 2nd, and 3rd Lens Groups and the stand-alone 4th Lens Group | 87.987 |
| Total Length of all the Lens Optics | 94.6 |
| Telephoto End | |
| Composite Focal Length of the 2nd and 3rd Lens Groups | 58.115 |

The 11th surface of the fourth preferred embodiment of the wide-angle zoom lens is shaped in the following manner:

| Effective Aperture | Angle of Normal Line to #11 Surface |
|---|---|
| 1.16 | 0.9168 |
| 2.32 | 1.8613 |
| 3.48 | 2.8583 |
| 4.64 | 3.9266 |
| 5.8 | 5.0769 |
| 6.96 | 6.3108 |
| 8.12 | 7.6204 |
| 9.28 | 8.99 |
| 10.44 | 10.3989 |
| 11.6 | 11.8262 |
| 12.76 | 13.257 |
| 13.92 | 14.6887 |
| 15.08 | 16.137 |
| 16.24 | 17.6374 |
| 17.4 | 19.2387 |
| 18.56 | 20.9814 |
| 19.72 | 22.8583 |
| 20.88 | 24.7632 |
| 22.04 | 26.4612 |
| 23.2 | 27.6603 |

The terms in the formulas applied to the fourth embodiment of the wide-angle zoom lens are given as follows:

$|f1b/f1a|=4.439$     Formula (11)

$\theta 25=5.077$     Formula (12)

$\theta 100/\theta 25=5.448$     Formula (13)

$Y\text{max}/Fw=1.409$     Formula (14)

$G1R2/F1=0.849$     Formula (15)

$(E4w-F123w)/F4=3.385$     Formula (21)

$(-F123w)/F4=0.739$     Formula (22)

$Fw*(E4w-F123w)/F4=34.857$     Formula (23)

$F23w/(-F1)=9.412$     Formula (24)

$BFw/(Fnow \cdot Fw)=1.05$     Formula (31)

$F23w/Fw=13.895$     Formula (32)

$F234w/(D12w)=1.484$     Formula (33)

$F234w/(D12w \cdot Fw)=0.144$     Formula (34)

$F23w/F23t=2.462$     Formula (35)

$D1Sw/OVLw=0.223$     Formula (41)

Arrangement of the 2nd Lens Group
   Positive-Negative & Negative-Positive
Arrangement of the 4th Lens Group
   Positive, Negative-Positive-Negative, & Negative FIG. 11 depicts spherical aberration, astigmatism, aberration of distortion, and chromatic aberration caused in the exemplary wide-angle zoom lens at the wide-angle end. FIG. 12 illustrates the similar types of aberration caused in the exemplary wide-angle zoom lens at the telephoto end.

In contrast, the prior art embodiment as disclosed in JPA-2006-039531 teaches the terms in the corresponding formulae as follows in conjunction with a first embodiment:

$|f1b/f1a|=1.349$     Formula (11)

$\theta 25=2.853$     Formula (12)

$\theta 100/\theta 25=9.742$     Formula (13)

$Y\text{max}/Fw=1.254$     Formula (14)

$G1R2/F1=1.250$     Formula (15)

$(E4w-F123w)/F4=7.336$     Formula (21)

$(-F123w)/F4=1.825$     Formula (22)

$Fw*(E4w-F123w)/F4=75.565$     Formula (23)

$F23w/(-F1)=4.753$     Formula (24)

$BFw/(Fnow \cdot Fw)=0.865$     Formula (31)

$F23w/Fw=6.528$     Formula (32)

$F234w/(D12w)=1.135$     Formula (33)

$F234w/(D12w \cdot Fw)=0.110$     Formula (34)

$F23w/F23t=1.392$     Formula (35)

$D1Sw/OVLw=0.409$     Formula (41)

Arrangement of the 2nd Lens Group
   Negative-Positive & Positive
Arrangement of the 4th Lens Group
   Positive & Negative-Positive The prior art embodiment as disclosed in JP-A-2006-039531 also teaches the terms in the corresponding formulae as follows in conjunction with a second embodiment:

$|f1b/f1a|=1.707$     Formula (11)

$\theta 25=1.146$     Formula (12)

$\theta 100/\theta 25=25.204$     Formula (13)

$Y\text{max}/Fw=1.2708$     Formula (14)

$G1R2/F1=1.280$     Formula (15)

$(E4w-F123w)/F4=5.557$     Formula (21)

$(-F123w)/F4=1.343$     Formula (22)

$Fw*(E4w-F123w)/F4=57.240$     Formula (23)

$F23w/(-F1)=5.412$     Formula (24)

$BFw/(Fnow \cdot Fw)=1.013$     Formula (31)

$F23w/Fw=7.651$     Formula (32)

$F234w/(D12w)=1.316$     Formula (33)

$F234w/(D12w \cdot Fw)=0.128$     Formula (34)

$F23w/F23t=1.340$     Formula (35)

$D1Sw/OVLw=0.366$     Formula (41)

Arrangement of the 2nd Lens Group
   Negative-Positive & Positive
Arrangement of the 4th Lens Group
   Positive & Negative-Positive The prior art embodiment as disclosed in JP-A-2006-039531 further teaches the terms in the corresponding formulae as follows in conjunction with a third embodiment:

$|f1b/f1a|=3.042$     Formula (11)

$θ25=0.252$     Formula (12)

$θ100/θ25=75.963$     Formula (13)

$Y\max/Fw=1.256$     Formula (14)

$G1R2/F1=1.104$     Formula (15)

$(E4w-F123w)/F4=5.658$     Formula (21)

$(-F123w)/F4=1.313$     Formula (22)

$Fw*(E4w-F123w)/F4=58.278$     Formula (23)

$F23w/(-F1)=5.853$     Formula (24)

$BFw/(Fnow \cdot Fw)=0.867$     Formula (31)

$F23w/Fw=9.655$     Formula (32)

$F234w/(D12w)=1.231$     Formula (33)

$F234w/(D12w \cdot Fw)=0.120$     Formula (34)

$F23w/F23t=1.284$     Formula (35)

$D1Sw/OVLw=0.348$     Formula (41)

Arrangement of the 2nd Lens Group
  Negative-Positive & Positive
Arrangement of the 4th Lens Group
  Positive & Negative-Positive The prior art embodiment as disclosed in JP-A-2006-039531 still further teaches the terms in the corresponding formulae as follows in conjunction with a fourth embodiment:

$|f1b/f1a|=1.449$     Formula (11)

$θ25=0.845$     Formula (12)

$θ100/θ25=29.206$     Formula (13)

$Y\max/Fw=1.261$     Formula (14)

$G1R2/F1=1.155$     Formula (15)

$(E4w-F123w)/F4=5.534$     Formula (21)

$(-F123w)/F4=1.293$     Formula (22)

$Fw*(E4w-F123w)/F4=56.996$     Formula (23)

$F23w/(-F1)=5.925$     Formula (24)

$BFw/(Fnow \cdot Fw)=1.013$     Formula (31)

$F23w/Fw=9.074$     Formula (32)

$F234w/(D12w)=1.189$     Formula (33)

$F234w/(D12w \cdot Fw)=0.115$     Formula (34)

$F23w/F23t=1.327$     Formula (35)

$D1Sw/OVLw=0.371$     Formula (41)

Arrangement of the 2nd Lens Group
  Negative-Positive & Positive
Arrangement of the 4th Lens Group
  Positive & Negative-Positive The prior art embodiment as disclosed in JP-A-2006-039531 also teaches the terms in the corresponding formulae as follows in conjunction with a fifth embodiment:

$|f1b/f1a|=1.443$     Formula (11)

$θ25=0.837$     Formula (12)

$θ100/θ25=27.419$     Formula (13)

$Y\max/Fw=1.288$     Formula (14)

$G1R2/F1=1.146$     Formula (15)

$(E4w-F123w)/F4=5.433$     Formula (21)

$(-F123w)/F4=1.268$     Formula (22)

$Fw*(E4w-F123w)/F4=55.965$     Formula (23)

$F23w/(-F1)=6.035$     Formula (24)

$BFw/(Fnow \cdot Fw)=0.978$     Formula (31)

$F23w/Fw=9.641$     Formula (32)

$F234w/(D12w)=1.227$     Formula (33)

$F234w/(D12w \cdot Fw)=0.119$     Formula (34)

$F23w/F23t=1.457$     Formula (35)

$D1Sw/OVLw=0.325$     Formula (41)

Arrangement of the 2nd Lens Group
  Negative-Positive & Positive
Arrangement of the 4th Lens Group
  Negative-Positive-Negative & Negative-Positive The prior art embodiment as disclosed in JP-A-2006-039531 also teaches the terms in the corresponding formulae as follows in conjunction with a sixth embodiment:

$|f1b/f1a|=2.195$     Formula (11)

$θ25=0.851$     Formula (12)

$θ100/θ25=26.901$     Formula (13)

$Y\max/Fw=1.258$     Formula (14)

$G1R2/F1=1.176$     Formula (15)

$(E4w-F123w)/F4=5.018$     Formula (21)

$(-F123w)/F4=1.161$     Formula (22)

$Fw*(E4w-F123w)/F4=51.683$     Formula (23)

$F23w/(-F1)=6.297$     Formula (24)

$BFw/(Fnow \cdot Fw)=1.015$     Formula (31)

$F23w/Fw=9.764$     Formula (32)

$F234w/(D12w)=1.190$     Formula (33)

$F234w/(D12w \cdot Fw)=0.116$     Formula (34)

$F23w/F23t=1.427$     Formula (35)

$D1Sw/OVLw=0.325$     Formula (41)

Arrangement of the 2nd Lens Group
   Negative-Positive & Positive
Arrangement of the 4th Lens Group
   Positive 86 Negative-Positive

What is claimed is:

1. In a wide-angle zoom lens having four groups of lens pieces which are the leading or foremost 1st lens group of negative refractivity closest to an objective field, the succeeding 2nd lens group of positive refractivity, the third lens group of negative refractivity, and the trailing 4th lens group of positive refractivity arranged in this order to move each lens group to vary optical power, the 1st lens group includes a front subset of the lens pieces of negative refractive power and a rear subset of negative refractive power the latter one of which is displaced toward the objective field for focusing from an infinitely far object to a near view; and the front end lens piece closest to the objective field in the 1st lens group is shaped in negative meniscus lens that has its concave surface faced toward an imaging plane and has the opposite surfaces shaped aspherical; the front and rear subsets of the 1st lens group meeting requirements of a focal length as expressed in the following formula:

$$3.5 \leq |f1b/f1a| \leq 6.0 \quad (11)$$

where f1a is a focal length of the front subset of the lens pieces in the 1st lens group and f1b is the focal length of the rear subset in the 1st lens group.

2. In a wide-angle zoom lens having four groups of lens pieces which are the leading or foremost 1st lens group of negative refractivity closest to an objective field, the succeeding 2nd lens group of positive refractivity, the third lens group of negative refractivity, and the trailing 4th lens group of positive refractivity arranged in this order to move each lens group to vary optical power, the 1st lens group includes a front subset of the lens pieces of negative refractive power and a rear subset of negative refractive power the latter one of which is displaced toward the objective field for focusing from an infinitely far object to a near view; and the front end lens piece closest to the objective field in the 1st lens group is shaped in negative meniscus lens that has its concave surface faced toward an imaging plane and has the opposite surfaces shaped aspherical; the aspherical surfaces meeting requirements as expressed in the following formulae:

$$3.5 \leq \theta 25 \leq 6.5 \quad (12)$$

$$4.5 \leq \theta 100/\theta 25 \leq 7.0 \quad (13)$$

where $\theta 25$ is an angle of a line normal to the front-end aspherical surface of the front-end lens piece along a perimeter radially 25% down from the optical axis or the mid point of the effective diameter, and $\theta 100$ is the angle of the line normal to the front-end aspherical surface along the outermost peripheral edge of the front-end lens piece.

3. The wide-angle zoom lens according to claim 1, wherein the wide-angle zoom meets a requirement as expressed in the following formula:

$$Y_{max}/F_W \geq 1.3 \quad (14)$$

where Ymax is the maximum real image height, and Fw is a focal length of the whole optics at the wide-angle end.

4. The wide-angle zoom lens according to claim 1, wherein the wide-angle zoom lens meets the requirements as expressed in the following formulae:

$$3.5 \leq \theta 25 \leq 6.5 \quad (12)$$

$$4.5 \leq \theta 100/\theta 25 \leq 7.0 \quad (13)$$

where $\theta 25$ is an angle of a line normal to the front-end aspherical surface of the front-end lens piece along a perimeter radially 25% down from the optical axis or the mid point of the effective diameter, and $\theta 100$ is the angle of the line normal to the front-end aspherical surface along the outermost peripheral edge of the front-end lens piece.

5. The wide-angle zoom lens according to claim 1, wherein the wide-angle zoom lens meets additional requirements as expressed in the following formulae:

$$0.7 \leq G1R2/F1 \leq 0.9 \quad (15)$$

where G1R2 is radius of curvature of the rear major surface of the front-end lens piece, facing to the imaging plane, and F1 is a focal length of the 1st lens group.

6. A wide-angle zoom lens has four groups of lens pieces which are the leading or foremost 1st lens group of negative refractivity closest to an objective field, the succeeding 2nd lens group of positive refractivity, the third lens group of negative refractivity, and the trailing 4th lens group of positive refractivity arranged in this order to move each lens group to vary optical power, the 1st lens group including a front subset of the lens pieces of negative refractive power and a rear subset of negative refractive power the latter one of which is displaced toward the objective field for focusing from an infinitely far point to a near view; and the 1st, 2nd and 3rd lens groups serving as a composite lens unit meet requirements of their composite focal length and clearance to an adjacent lens group as follows:

$$1.95 \leq (E4w - F123w)/F4 \leq 3.7 \quad (21)$$

where f123w is a focal length of the composite lens unit of the 1st, 2nd and 3rd lens groups when set to infinity focus at the wide-angle end, F4 is the focal length of the 4th lens group, and E4w is a distance from the principal point closer to an imaging plane in the composite lens unit of the 1st, 2nd and 3rd lens groups to the principal point closer to objects in the 4th lens group.

7. A wide-angle zoom lens has four groups of lens pieces which are the leading or foremost 1st lens group of negative refractivity closest to objects, the succeeding 2nd lens group of positive refractivity, the third lens group of negative refractivity, and the trailing 4th lens group of positive refractivity arranged in this order to move each lens group to vary optical power, the 1st lens group including a front subset of the lens pieces of negative refractive power and a rear subset of negative refractive power the latter one of which is displaced toward the objects for focusing from an infinitely far point to a near view; and the 1st, 2nd and 3rd lens groups serving as a composite lens unit meet requirements of focal length and clearance to an adjacent lens group as follows:

$$0.5 \leq (-F123w)/F4 \leq 0.85 \quad (22).$$

8. The wide-angle zoom lens according to claim 6, further satisfying requirements defined as follows:

$$0.5 \leq (-F123w)/F4 \leq 0.85 \quad (22).$$

9. The wide-angle zoom lens according to claim 6, wherein the lens groups further satisfies requirements defined as follows:

$$20 \leq Fw^*(E4w - F123w)/F4 \leq 38 \quad (23)$$

where Fw is the focal length of the entire optics at the wide-angle end.

10. The wide-angle zoom lens according to claim 6, further satisfying requirements defined as follows:

$$F23w/(-F1)6.5 \quad (24)$$

where F23w is a focal length of a composite lens unit of the 2nd and 3rd lens groups at the wide-angle end while F1 is the focal length of the 1st lens group to infinity focus at the wide-angle end.

11. The wide-angle zoom lens according to claim 6, wherein the 1st lens group of negative refractivity includes the front subset of the lens pieces of negative refractive power and the rear subset of negative refractive power, and the rear subset of the 1st lens group are displaced for focusing from infinitely far point to near view.

12. The wide-angle zoom lens according to claim 6, wherein the front end lens piece closest to the objects in the 1st lens group is a negative meniscus lens having its concave surface faced toward the imaging plane.

13. A wide-angle zoom lens has four groups of lens pieces which are the leading or foremost 1st lens group of negative refractivity closest to an objective field, the succeeding 2nd lens group of positive refractivity, the 3rd lens group of negative refractivity, and the trailing 4th lens group of positive refractivity arranged in this order to move each lens group to vary optical power; and intervals between the lens groups adjacent to each other, a focal length of each lens group, and the focal length of a composite lens unit(s) of some of the lens groups meet requirements defined as follows:

$$1.03 BFw/(Fnow*Fw) \leq 1.2 \tag{31}$$

where BFw is a back focus, Fnow is an F-number at the wide-angle end, and Fw is a focal length of the entire optics at the wide-angle end.

14. A wide-angle zoom lens has four groups of lens pieces which are the leading or foremost 1st lens group of negative refractivity closest to objects, the succeeding 2nd lens group of positive refractivity, the third lens group of negative refractivity, and the trailing 4th lens group of positive refractivity arranged in this order to move each lens group to vary optical power; and intervals between the lens groups adjacent to each other, a focal length of each lens group, and the focal length of a composite lens unit(s) of some of the lens groups meet requirements defined as follows:

$$F23w/Fw \geq 12 \tag{32}$$

where F23w is a focal length of the composite lens unit of the 2nd and 3rd lens groups at the wide-angle end while Fw is the focal length of the entire optics at the wide-angle end.

15. A wide-angle zoom lens has four groups of lens pieces which are the leading or foremost 1st lens group of negative refractivity closest to objects, the succeeding 2nd lens group of positive refractivity, the third lens group of negative refractivity, and the trailing 4th lens group of positive refractivity arranged in this order to move each lens group to vary optical power; and intervals between the lens groups adjacent to each other, a focal length of each lens group, and the focal length of a composite lens unit(s) of some of the lens groups meet requirements defined as follows:

$$F234w/(D12w) \geq 1.3 \tag{33}$$

where F234w is a focal length of the composite lens unit of the 2nd, 3rd and 4th lens groups at the wide-angle end while D12w is a distance between the 1st and 2nd lens groups when set to infinity focus at the wide-angle end.

16. The wide-angle zoom lens according to claim 13, further satisfying the requirements as defined in the formula (32).

17. The wide-angle zoom lens according to claim 13, further satisfying the requirements as defined in the formula (33).

18. The wide-angle zoom lenses according to claim 13, further satisfying requirements defined as follows:

$$F234w/(D12w*Fw) \geq 0.13 \tag{34}$$

where F234w is a focal length of a composite lens unit of the 2nd, 3rd and 4th lens groups at the wide-angle end, D12w is a distance between the 1st and 2nd lens groups when it is set to infinity focus at the wide-angle end, and Fw is the focal length of the entire optics at the wide-angle end.

19. The wide-angle zoom lens according to claim 13, further satisfying requirements defined as follows:

$$|F23w/F23t| \geq 2.0 \tag{35}$$

where F23w is a focal length of the composite lens unit of the 2nd and 3rd lens groups at the wide-angle end while F23t is the focal length of the composite lens unit of the 2nd and 3rd lens groups at the telephoto end.

20. The wide-angle zoom lens according to claim 13, wherein the 1st lens group of negative refractivity includes a front subset of the lens pieces of negative refractive power and a rear subset of negative refractive power, and the rear subset of the 1st lens group are displaced for focusing from infinitely far point to near view.

21. In a wide-angle zoom lens that has four groups of lens pieces which are the leading or foremost 1st lens group closest to objects, the succeeding 2nd lens group of positive refractivity, the 3rd lens group of negative refractivity, and the trailing 4th lens group of positive refractivity arranged in this order to move each lens group to vary optical power, the 1st lens group is comprised of a front subset of the lens pieces of negative refractive power and a rear subset of the lens pieces of negative refractive power the latter one of which are displaced toward the objects for focusing from an infinitely far point to near view; the 2nd lens group has more than one lens pieces, including the foremost lens piece of positive refractive power closer to the objects than any other and the rearmost lens piece of negative refractive power closer to the imaging plane; the 4th lens group has also more than one lens pieces, including the foremost lens piece of positive refractive power and the rearmost lens piece of negative refractive power; and at least one of the lens pieces in the 4th lens group has one or both of its opposite major surfaces shaped aspherical; the zoom lens meeting requirements defined as follows:

$$0.15 \leq D1Sw/OVLw \leq 0.3 \tag{41}$$

where D1Sw is a distance from the backmost surface closest to the imaging plane in the 1st lens group to the aperture stop when it is set to infinity focus at the wide-angle end, and OVLw is the overall length of the entire lens optics (the maximized extension from the front end surface closest to the objects to the backmost surface closest to the imaging plane) at the wide-angle end.

* * * * *